United States Patent
Zaima

(10) Patent No.: US 10,126,694 B2
(45) Date of Patent: Nov. 13, 2018

(54) IMAGE FORMING APPARATUS CAPABLE OF PERFORMING CALIBRATION

(71) Applicant: CANON KABUSHIKI KAISHA, Tokyo (JP)

(72) Inventor: Nobuhiko Zaima, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/494,172

(22) Filed: Apr. 21, 2017

(65) Prior Publication Data

US 2017/0307994 A1 Oct. 26, 2017

(30) Foreign Application Priority Data

Apr. 26, 2016 (JP) .................... 2016-087602
Feb. 9, 2017 (JP) .................... 2017-022469

(51) Int. Cl.
*G03G 15/00* (2006.01)
*G03G 15/01* (2006.01)

(52) U.S. Cl.
CPC ..... *G03G 15/5058* (2013.01); *G03G 15/0131* (2013.01); *G03G 15/5062* (2013.01); *G03G 15/5041* (2013.01)

(58) Field of Classification Search
CPC ............ G03G 15/0131; G03G 15/50; G03G 15/5041; G03G 15/5058; G03G 15/5062

USPC .......................... 399/38, 46, 49, 72
See application file for complete search history.

(56) References Cited

U.S. PATENT DOCUMENTS 6,115,561 A * 9/2000 Fukushima ........ G03G 15/0855
399/49
9,116,470 B2 8/2015 Shirafuji et al.
2011/0299102 A1 12/2011 Matsuzaki

FOREIGN PATENT DOCUMENTS

JP 2006-165864 A 6/2006

* cited by examiner

*Primary Examiner* — Benjamin Schmitt
(74) *Attorney, Agent, or Firm* — Canon U.S.A., Inc. IP Division

(57) ABSTRACT

An image forming apparatus includes a converting unit, a plurality of image forming units, a scanning unit, a first generating unit, a second generating unit, an intermediate transfer member, a measuring unit, and a controller configured to, after the first generating unit generates an image forming condition, control the plurality of image forming units to form a measurement image, control the measuring unit to measure the measurement image, and control whether to control the second generating unit to generate a conversion condition or not on the basis of a result of the measurement performed on a previous measurement image and a result of the measurement performed on a current measurement image.

8 Claims, 22 Drawing Sheets

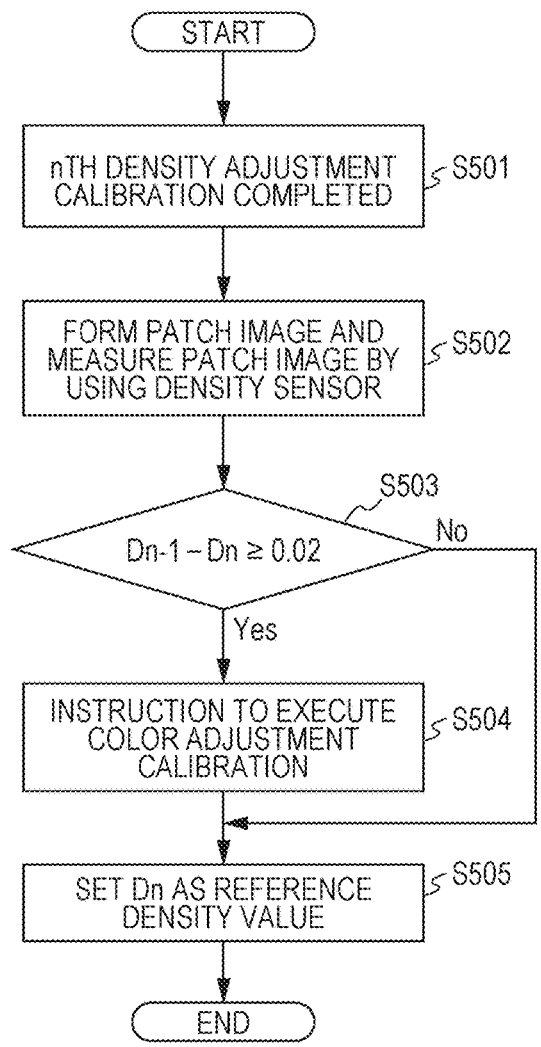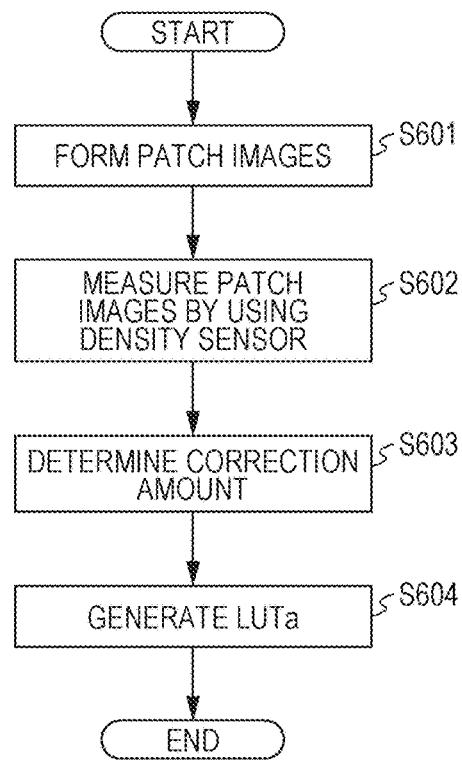
FIG. 17A
FIG. 17B

IMAGE FORMING APPARATUS CAPABLE OF PERFORMING CALIBRATION

BACKGROUND

Field of Art

The present disclosure relates to calibration to be executed by an image forming apparatus.

Description of the Related Art

In an electrophotographic image forming apparatus, a photosensitive member is electrostatically charged and is exposed to form an electrostatic latent image. The electrostatic latent image on the photosensitive member is developed by using a developing agent, and an image is formed on the photosensitive member. Then, in the image forming apparatus, the image on the photosensitive member is transferred to a recording medium, and a resulting printed matter is output.

In recent years, electrophotographic image forming apparatuses have improved performance. Some image forming apparatuses among such electrophotographic image forming apparatuses in recent years may output a printed matter having image quality equal to that of a printed matter produced by an offset printing machine.

However, electrophotographic image forming apparatuses may have instability inherent to electrophotography. Thus, the amount of change in color of a printed matter produced by an electrophotographic image forming apparatus is larger than the amount of change in color of a printed matter produced by an offset printing machine. Accordingly, in an electrophotographic image forming apparatus, a test image is formed on a recording medium, and the test image is detected by a sensor. Based on a result of detection performed on the test image, image forming conditions are controlled such that the density of an image can be equal to a target density.

Further in the electrophotographic image forming apparatus, yellow, magenta, cyan, and black images are transferred one upon another to an intermediate transfer member to form a full-color image. However, even when image forming conditions are controlled on the basis of a result of detection performed on a monochromatic test image, there is a possibility that color of a mixed-color image may not be equal to target color. This is due to occurrence of a re-transfer phenomenon.

FIG. 1 is a cross-sectional view of an essential part illustrating a transfer nip part for transferring an image on a photosensitive member to an intermediate transfer member. As illustrated in FIG. 1, when the charge polarity of a developing agent transferred to the intermediate transfer member is reversed, the developing agent having the opposite polarity may unintentionally be transferred from the intermediate transfer member to the photosensitive member. This is called a re-transfer phenomenon. When such a re-transfer phenomenon occurs, the amount of the developing agent on the intermediate transfer member is reduced. Thus, the density of the output image decreases.

The amount (re-transferred amount) of the developing agent re-transferred from the intermediate transfer member to the photosensitive member is influenced by the charge amount of the developing agent. When the charge amount of the developing agent increases, the charge polarity of the developing agent is not easily reversed in the transfer nip part. Thus, as the charge amount of the developing agent increases, the re-transferred amount decreases. On the other hand, as illustrated in FIG. 3, when the charge amount of the developing agent decreases, the charge polarity of the developing agent is easily reversed at the transfer nip part. Thus, as the charge amount of the developing agent decreases, the re-transferred amount increases. In other words, when the charge amount of the developing agent changes, the density of the output image may change. The charge amount of the developing agent may also depend on its ambient environment, a consumed amount, a replenishing amount, mixing time, and conditioning time. For that, in a case the charge amount of the developing agent changes significantly, calibration may be required to be executed to adjust image forming conditions in the image forming apparatus.

Next, the aforementioned relationship between tint changes in a mixed-color image and a re-transfer phenomenon will be described. For example, in order to adjust the density of a monochromatic image in magenta, a magenta test image passes through a cyan transfer nip part and a black transfer nip part. Thus, in a case where image forming conditions for magenta are controlled on the basis of the magenta test image, the image forming conditions are adjusted in consideration of a re-transferred amount. In other words, the image forming conditions for magenta are defined so as to increase, by a re-transferred amount, the amount of a developing agent to be transferred from a photosensitive member to an intermediate transfer member.

On the other hand, as illustrated in FIG. 4, in order to adjust the color of a mixed-color image in magenta and cyan, because a cyan image is transferred onto a magenta image, the amount of a magenta developing agent to be re-transferred from the intermediate transfer member to a cyan photosensitive member decreases. For example, when a cyan developing agent is transferred uniformly onto a magenta image, the amount of a magenta developing agent re-transferred from the intermediate transfer member to the cyan photosensitive member is substantially equal to 0.

Because the re-transferred amount is influenced by the charge amount of a developing agent, as described above, a change of the charge amount may change the correspondence relationship between the amount of the developing agent of a monochromatic image and the amount of developing agent of the mixed-color image. Therefore, even when the monochromatic image has a target density, there is a possibility that the mixed-color image may not have target color.

Accordingly, a method disclosed in US2011/0299102 generates conversion conditions for converting image data such that the resulting mixed-color image can have a target color. According to the method disclosed in US2011/0299102, a mixed-color pattern image is formed on a recording medium, and a sensor detects the pattern image so that conversion conditions for changing a combination of image signal values of color components to a combination of image signal values corresponding to target color can be generated on the basis of the detection result.

However, when the charge amount of the developing agent has a very small change, there is a high possibility that adjustment of the density of a monochromatic image to a target density also adjusts the color of the mixed-color image to target color. Even though the charge amount of the developing agent has a very small change, both of calibration for adjusting the density of the monochromatic image and calibration for generating conversion conditions may be executed, which increases downtime.

SUMMARY

Accordingly, the present disclosure determines whether to execute calibration for adjusting color of a mixed-color image or not.

According to an aspect of the present disclosure, an image forming apparatus includes a converting unit configured to convert image data on the basis of conversion conditions, a plurality of image forming units configured to form images, each having a different color, on a recording medium, a scanning unit configured to scan a pattern image formed on a recording medium, a first generating unit configured to control the plurality of image forming units to form a monochromatic pattern image on a recording medium, control the scanning unit to scan the monochromatic pattern image, and generate an image forming condition on the basis of a result of the scanning performed on the monochromatic pattern image, a second generating unit configured to control the plurality of image forming units to form a mixed-color pattern image on a recording medium, control the scanning unit to scan the mixed-color pattern image, and generate the conversion condition on the basis of a result of the scanning performed on the mixed-color pattern image, an intermediate transfer member to which a measurement image formed by the plurality of image forming units is transferred, a measuring unit configured to measure the measurement image formed on the intermediate transfer member, and a controller configured to, after the first generating unit generates the image forming condition, control the plurality of image forming units to form the measurement image, control the measuring unit to measure the measurement image on the intermediate transfer member and control whether to control the second generating unit to generate the conversion condition or not on the basis of a result of the measurement performed on a previous measurement image and a result of the measurement performed on a current measurement image. The plurality of image forming units form an output image on the basis of the image data converted by the converting unit.

According to another aspect of the present disclosure, an image forming apparatus includes a converting unit configured to convert image data on the basis of conversion conditions, a plurality of image forming units configured to form images, each having a different color, on a recording medium, a scanning unit configured to scan a pattern image formed on a recording medium, a first generating unit configured to control the plurality of image forming units to form a monochromatic pattern image on a recording medium, control the scanning unit to scan the monochromatic pattern image, and generate an image forming condition on the basis of a result of the scanning performed on the monochromatic pattern image, a second generating unit configured to control the plurality of image forming units to form a mixed-color pattern image on a recording medium, control the scanning unit to scan the mixed-color pattern image, and generate the conversion condition on the basis of a result of the scanning performed on the mixed-color pattern image, an intermediate transfer member to which a measurement image formed by the image forming unit is transferred, a measuring unit configured to measure the measurement image formed on the intermediate transfer member, and a notifying unit configured to, after the first generating unit generates the image forming condition, control the plurality of image forming units to form the measurement image, control the measuring unit to measure the measurement image on the intermediate transfer member, and notify timing for updating the conversion condition on the basis of a result of the measurement performed on a previous measurement image and a result of the measurement performed on a current measurement image.

Further features of the present invention will become apparent from the following description of exemplary embodiments with reference to the attached drawings.

BRIEF DESCRIPTION OF THE DRAWINGS

FIGS. 17A and 17B are flowcharts illustrating other determination processing and patch gradation control.

DESCRIPTION OF THE EMBODIMENTS

An electrophotographic color copier will be described below. The present disclosure is applicable to any image forming apparatus in which calibration is to be executed. The image forming apparatus may be commercially available as, for example, a printing apparatus, a printer, a copy machine, a multi-functional apparatus, or a facsimile machine. A recording medium to be used therefor may be called as recording paper, a recording member, paper, a sheet, a transfer material, or transfer paper. The recording medium may be made of paper, a fiber, a film or a resin.

Figure 1:
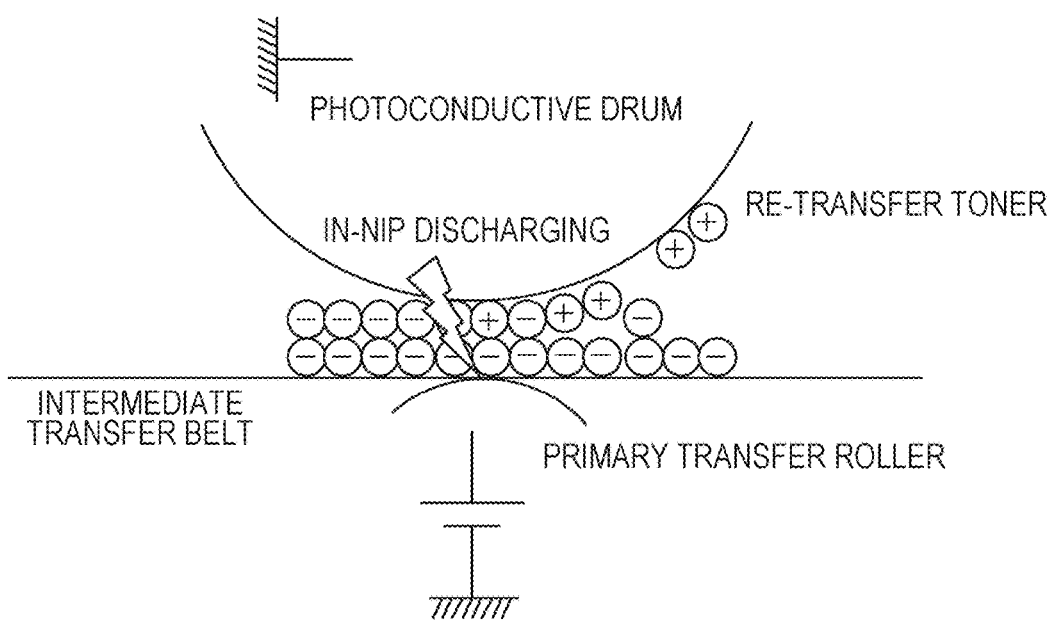
FIG. 1 is a cross-sectional view of an essential part of a transfer nip part in an image forming apparatus.
Figure 2:
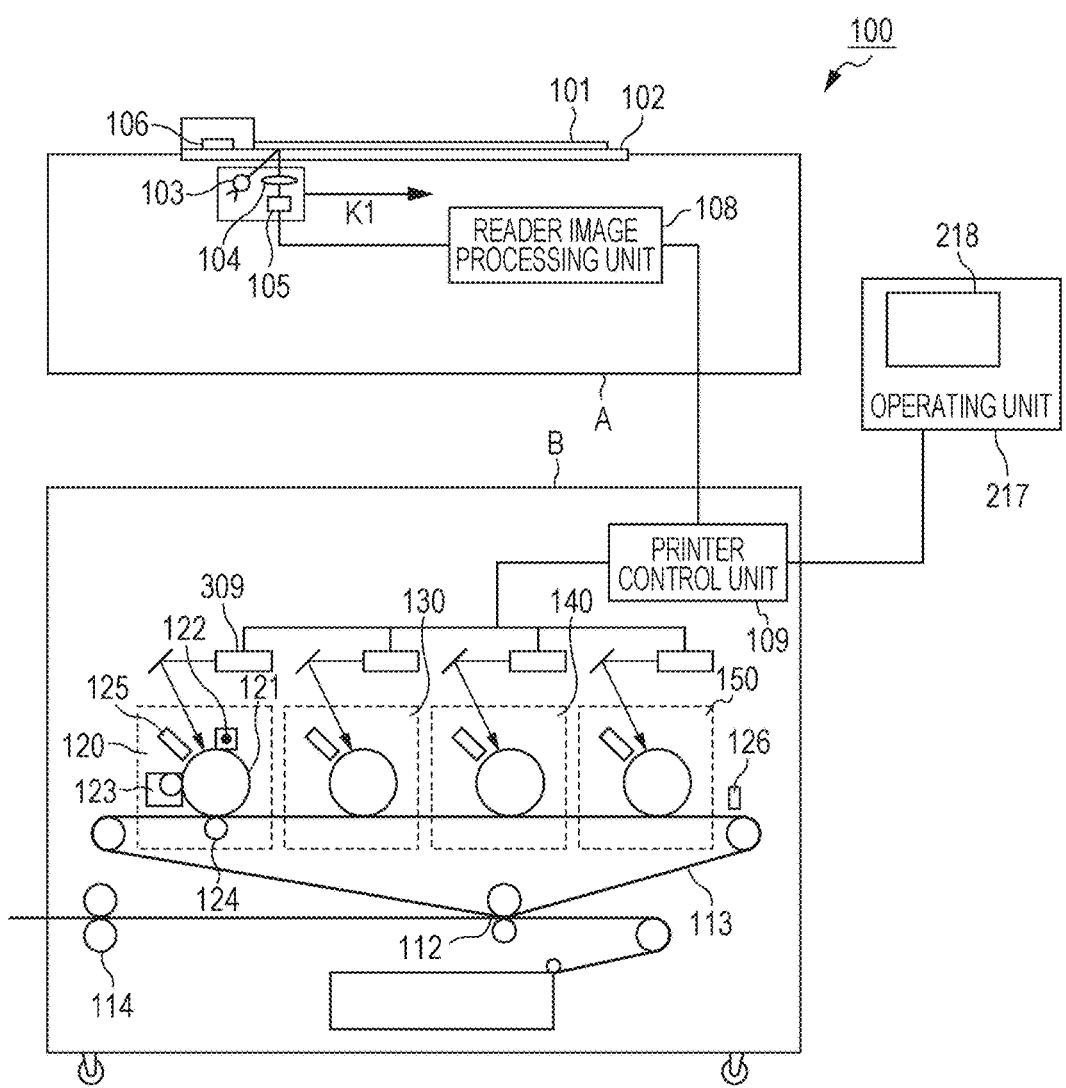
FIG. 2 is a schematic cross-sectional view of the image forming apparatus.
Figure 3:
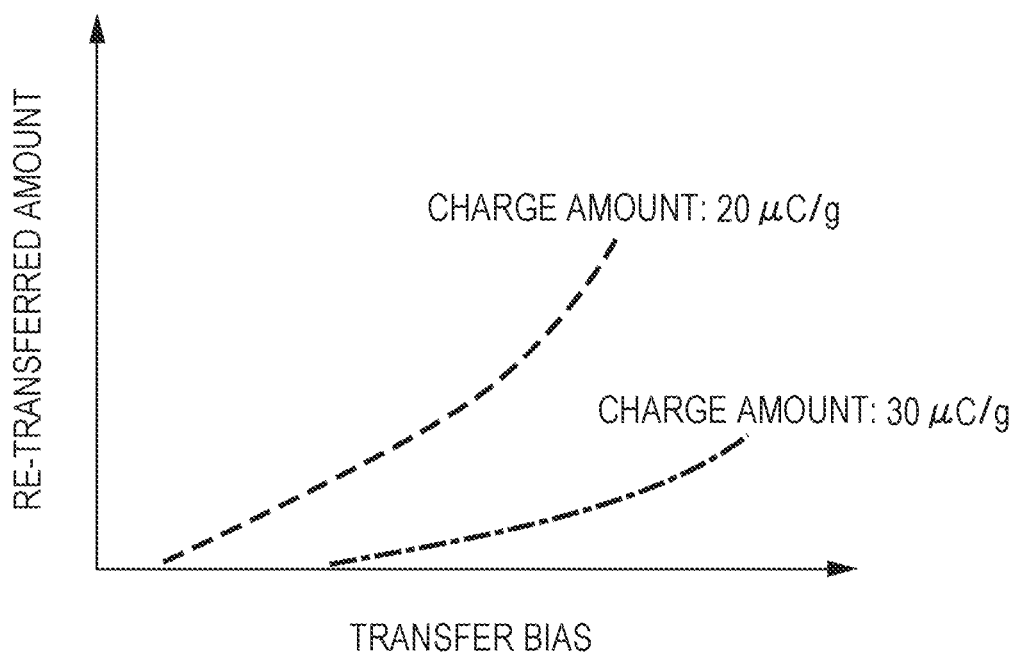
FIG. 3 illustrates a relationship between charge amounts and re-transferred amounts of a developing agent.
Figure 4:
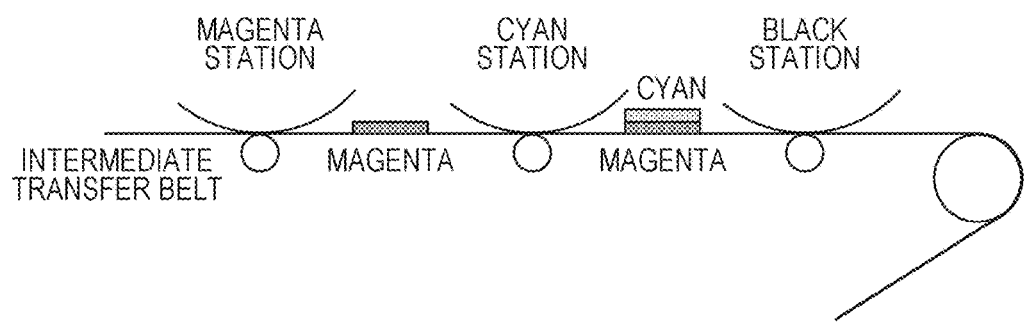
FIG. 4 is a schematic diagram illustrating a state of an image transferred to an intermediate transfer member.

FIG. 2 is a schematic cross-sectional view of an image forming apparatus 100. The image forming apparatus 100 includes a reader A, a printer B configured to form an image on a recording medium, and an operating unit 217.

Figure 6:
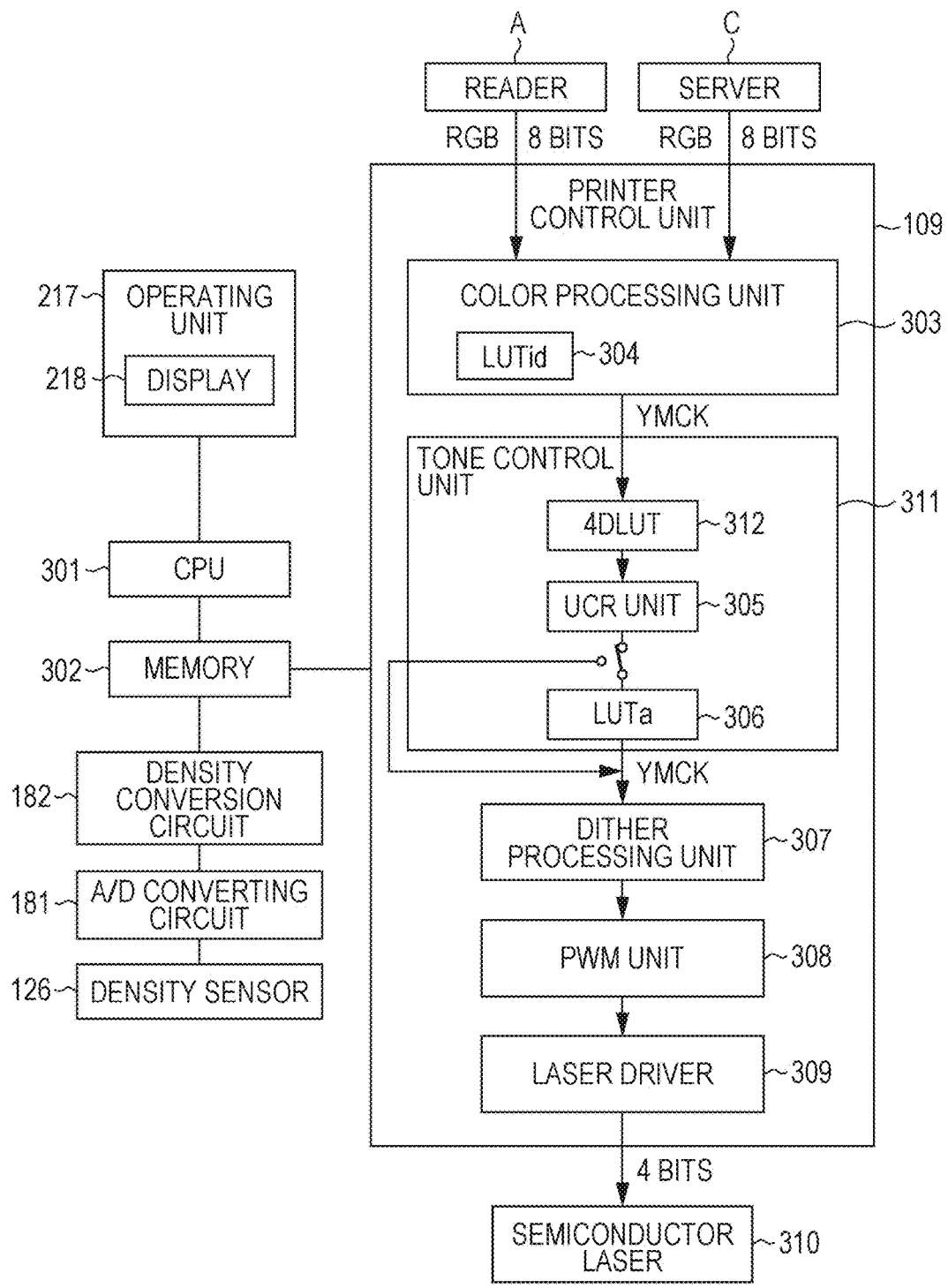
FIG. 6 is a control block diagram of the image forming apparatus.

The reader A includes a platen glass 102, a light source 103, an optical system 104, a CCD sensor 105, and a white reference plate 106. The reader A is controlled by a CPU 301 (FIG. 6). The light source 103 radiates light to a document 101 mounted on the platen glass 102. The reflected light from the document is focused onto a CCD sensor 105 through the optical system 104. The light source 103, the optical system 104, and the CCD sensor 105 are accommodated in a carriage, and the carriage is movable in a direction indicated by an arrow K1. Thus, the CCD sensor 105 can read an image of a document of one page. In other words, the reader A functions as a scanning unit configured to scan the document 101 mounted on the platen glass 102. The CCD sensor 105 is configured to transfer an electric signal corresponding to an image of a document to a reader image processing unit 108. The reader image processing unit 108 is configured to generate an image signal on the basis of an electric signal. The white reference plate 106 is read by the reader A because the white reference plate 106 is configured to perform shading correction on a reading result output from the reader A. Because the shading correction is a publicly known technology, the description thereon will be omitted. The scanning unit may be a device that can be used to obtain an image. The image obtained by the scanning unit may be on a recording medium.

The printer B includes image forming units 120, 130, 140, and 150, an intermediate transfer belt 113, a secondary transfer device 112, and a fuser 114. The printer unit B includes a density sensor 126 configured to measure a measurement image formed on the intermediate transfer belt 113. The image forming unit 120 includes a photosensitive drum 121, a charger 122, a developer device 123, a primary transfer device 124, a laser driver 309 (hereinafter, called an LD 309). The image forming unit 120 further has a surface potential sensor 125 configured to measure a surface potential of the photosensitive drum 121. The surface potential measured by the surface potential sensor 125 is usable for adjusting a contrast potential. An image forming unit may be a device which forms an image which is transferred onto which intermediate transfer member which then can transfer that image onto a recording medium. The intermediate transfer member is a member that transfers an image from a plurality of image forming units to a recording medium. The density sensor 126 is an example of a measuring unit. The measuring unit may be a device which measures information about an image formed on the intermediate transfer member.

The image forming unit 120 forms a yellow (Y) image, the image forming unit 130 forms a magenta (M) image, the image forming unit 140 forms a cyan (C) image, and the image forming unit 150 forms a black (K) image. The image forming units 120, 130, 140, and 150 have a substantially identical configuration. The configuration of the image forming unit 120 for forming a yellow image will be described below.

The photosensitive drum 121 has a surface having thereon a photosensitive layer. The photosensitive drum functions as a photosensitive member. The photosensitive drum 121 is rotated by a motor, not illustrated. The charger 122 is configured to uniformly electrostatically charge the surface of the photosensitive drum 121. The LD 309 is configured to expose the photosensitive drum 121 electrostatically charged by the charger 122 to form an electrostatic latent image. The developer device 123 is configured to develop an electrostatic latent image on the photosensitive drum 121 to form an image. The primary transfer device 124 is configured to transfer an image on the photosensitive drum 121 to the intermediate transfer belt 113. The intermediate transfer belt 113 functions as an intermediate transfer member to which an image is to be transferred.

The image forming units 120, 130, 140, and 150 are configured to transfer an image by placing images in colors one upon another on the intermediate transfer belt 113. Thus, the intermediate transfer belt 113 bears a full-color image. The intermediate transfer belt 113 is configured to convey an image to the secondary transfer device 112. The secondary transfer device 112 is configured to transfer an image on the intermediate transfer belt 113 to a recording medium. A recording medium to which an image has been transferred is conveyed to the fuser 114. The fuser 114 has a pair of rollers with a heater, not illustrated. The fuser is configured to heat a recording medium through the pair of rollers and applies pressure to the recording medium to fix an image thereon to the recording medium. The recording medium on which the image is fixed is discharged from the image forming apparatus 100 through a roller, not illustrated.

The density sensor 126 has an LED configured to emit light to the intermediate transfer belt 113, and a photodiode configured to receive reflected light from the intermediate transfer belt 113. The density sensor 126 is configured to measure reflected light from a measurement image formed on the intermediate transfer belt 113. The operating unit 217 has a start button usable for controlling the reader A to start scanning of a document, a key pad, and a display 218. The display 218 is configured to display the number of sheets to be printed, print settings, or a state of the image forming apparatus 100.

Figure 5:
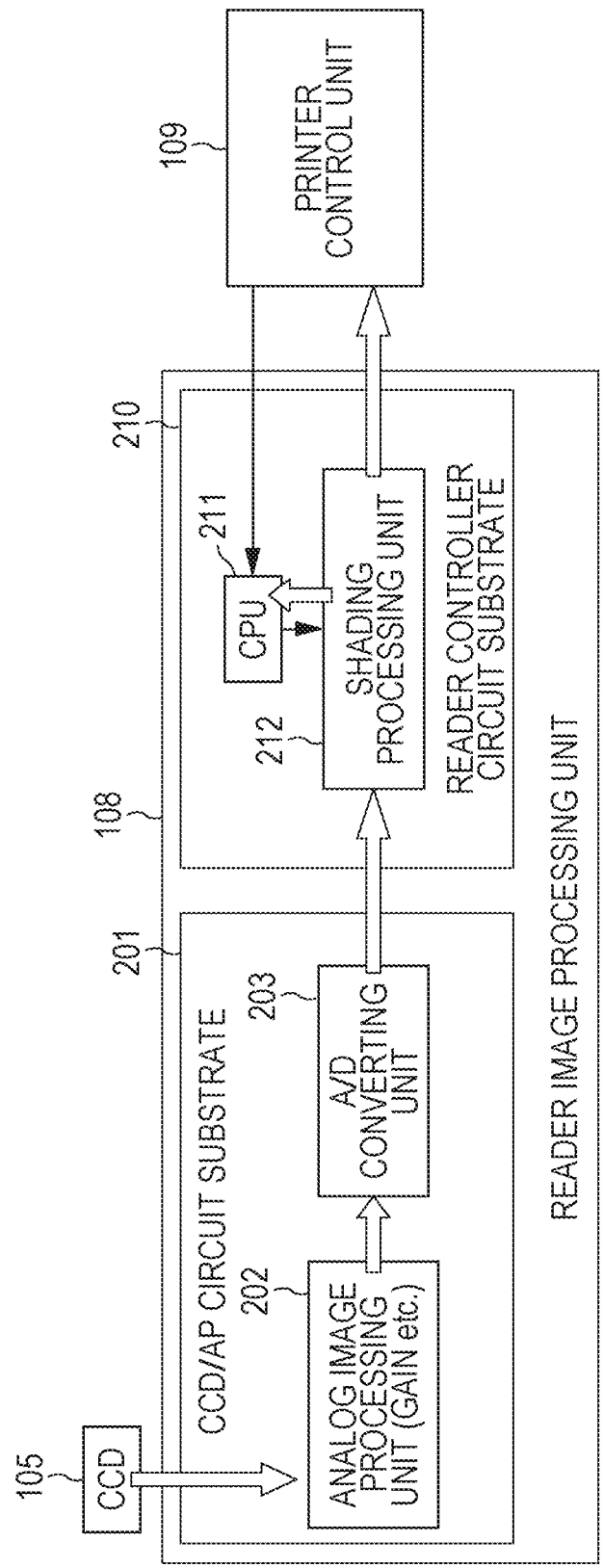
FIG. 5 is a control block diagram of a reader image processing unit.

FIG. 5 is a control block diagram illustrating the reader image processing unit 108. A CCD/AP circuit substrate 201 includes an analog image processing unit 202 and an A/D converting unit 203. The analog image processing unit 202 is configured to amplify an image signal transferred from the CCD sensor 105. The A/D converting unit 203 is configured to convert an image signal from an analog value to a digital value. The CCD/AP circuit substrate 201 is configured to transfer an image signal to a reader controller circuit substrate 210. The reader controller circuit substrate 210 includes a CPU 211 and a shading processing unit 212. The CPU 211 is configured to control the shading processing unit 212 to perform shading correction on an image signal. The CPU 211 is configured to transfer an image signal to the printer control unit 109. An image signal output from the reader controller circuit substrate 210 includes brightness information of red (R), green (G), and blue (B).

The printer control unit 109 is configured to generate a laser output signal on the basis of an image signal transferred from the reader image processing unit 108. The printer control unit 109 is configured to output a laser output signal to the LD 309. The LD 309 is configured to control a semiconductor laser 310 (FIG. 6) on the basis of a laser output signal. The semiconductor laser 310 (FIG. 6) is configured to emit a laser beam on the basis of a laser output signal. The laser beam is deflected by a polygonal mirror and scans the photosensitive drum 121. Thus, an electrostatic latent image is formed on the photosensitive drum 121. In other words, the LD 309 is configured to expose the photosensitive drum 121 on the basis of an image signal to form an electrostatic latent image on the photosensitive drum 121.

FIG. 6 is a control block diagram illustrating the image forming apparatus 100 connected to a printer server C over a network. FIG. 6 does not illustrate a control block diagram of the reader A illustrated in FIG. 5. The CPU 301 is configured to generally control the components of the image forming apparatus 100. A memory 302 may be a ROM and/or a RAM and is configured to store a control program and data.

An image signal processed in the reader A or the printer server C is input to a color processing unit 303 in the printer control unit 109. The color processing unit 303 converts red (R), green (G), and blue (B) brightness information to yellow (Y), magenta (M), cyan (C), and black (K) image signals. The image signals output from the color processing unit 303 may include 10-bit digital signal values, for example. An LUTid 304 is a brightness-density conversion table usable for converting brightness information included in the image signals output from the reader A to density information. In a case where the image forming apparatus 100 executes calibration on the basis of a result of scanning performed by the reader A, the LUTid 304 in the color processing unit 303 converts the scanning result output from the reader A to density information. The density information is a different type of parameter from those of the yellow (Y), magenta (M), cyan (C), and black (K) image signals. The density information corresponding to a pattern image having a maximum density may be equal to 1.6, for example.

A tone control unit 311 includes a four-dimensional LUT 312, a UCR unit 305, and an LUTa 306. The tone control unit 311 is configured to correct an image signal for correcting a tone characteristic of an output image formed by the printer B to an ideal tone characteristic.

The 4DLUT 312 is a color conversion table for correcting a four-dimensional color space of yellow, magenta, cyan, and black. The 4DLUT 312 is generated by the CPU 301 in color adjustment calibration, which will be described below. The 4DLUT 312 corresponds to conversion conditions for converting a combination of yellow, magenta, cyan, and black image signal values. A converting unit may be configured to convert image data on the basis of conversion conditions which corresponds to the 4DLUT 312 or similar conversion conditions. The converting unit may be implemented as software recorded on a non-transitory computer readable medium. The converting unit may be implemented one or more general purpose or application specific processors. The converting unit may be implemented as a combination of software and one or more processors. One or more generating units may control image forming units to form pattern images and generate image forming conditions. The one or more generating units may be implemented as software recorded on a non-transitory computer readable medium. The one or more generating units may be implemented one or more general purpose or application specific processors. The one or more generating units may be implemented as a combination of software and one or more processors.

The UCR unit 305 is configured to perform an under color removable process to suppress the attached amount of a developing agent of an image on a recording medium. The under color removable process is a process for replacing a sum total of cyan, magenta, and yellow image signal values to prevent a change of tint of an image such that an integrated value of the image signals in pixels can be lower than a predefined value.

The LUTa 306 is a one-dimensional look-up table (hereinafter, called an LUT) for converting image signal values to correct a tone characteristic (density characteristic) of an output image formed by the printer B. The LUTa 306 is usable for converting image signal values of colors. Thus, the LUTa 306 includes four of a yellow LUT, a magenta LUT, a cyan LUT, and a black LUT. The LUTa 306 is generated by the CPU 301 in density adjustment calibration, which will be described below.

A dither processing unit 307 is configured to perform dither processing on an image signal output from the tone control unit 311. Thus, the image signal is converted to a 4-bit digital signals. A PWM unit 308 is configured to generate a laser output signal for controlling the semiconductor laser 310 on the basis of an image signal. The LD 309 is configured to control the semiconductor laser 310 on the basis of a laser output signal generated by the PWM unit 308.

An A/D conversion circuit 181 is configured to convert an analog signal output from the density sensor 126 to a digital signal. A density conversion circuit 182 is configured to convert a digital signal output from the A/D conversion circuit 181 to an optical density value. The CPU 301 is configured to control the image forming units 120, 130, 140, and 150 to form a measurement image on the intermediate transfer belt 113, control the density sensor 126 to measure the measurement image, and acquire the density value of the measurement image on the basis of the measurement result. The CPU 301 then can acquire a tone characteristic of the printer B on the basis of the density value of the measurement image.

Next, the density adjustment calibration and color adjustment calibration to be executed by the CPU 301 in the image forming apparatus 100 will be described. When density adjustment calibration is executed, the CPU 301 determines image forming conditions such that the density of a monochromatic image can be equal to a target density on the basis of a result of the measurement performed on a pattern image. On the other hand, when color adjustment calibration is executed, the CPU 301 generates a 4DLUT 312 such that color of a mixed-color image can be target color.

It should be noted that the density adjustment calibration includes a first calibration for controlling a contrast potential such that an output image can have a target maximum density and a second calibration for generating an LUTa 306 such that an output image can have an ideal tone characteristic. When the density adjustment calibration is executed, the CPU 301 executes the first calibration first and executes the second calibration after the contrast potential is controlled.

Figure 7:
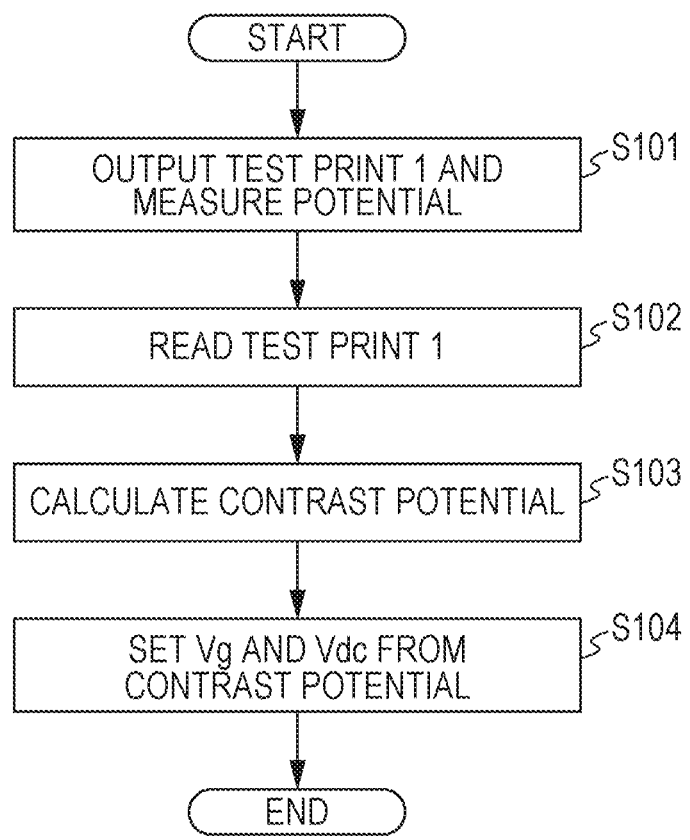
FIG. 7 is a flowchart illustrating a first calibration.
Figure 11:
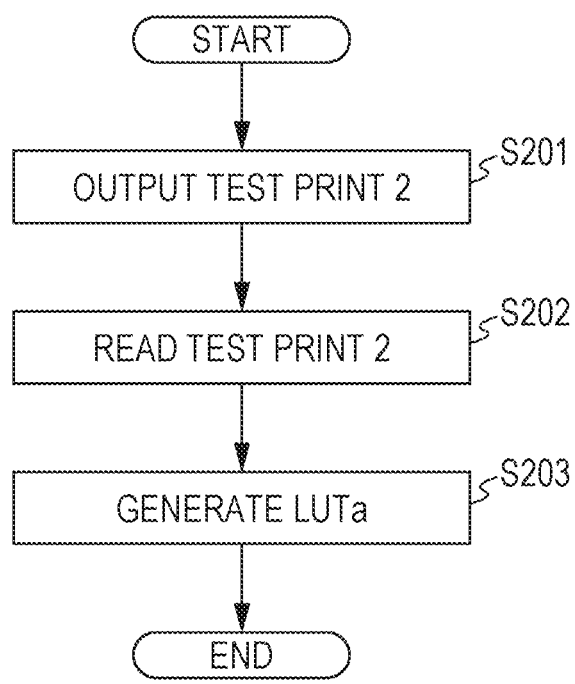
FIG. 11 is a flowchart illustrating a second calibration.

When a command to execute the density adjustment calibration is input from the operating unit 217, the CPU 301 executes the first calibration illustrated in the flowchart in FIG. 7. After the processing of the first calibration completes, the CPU 301 executes the second calibration illustrated in the flowchart in FIG. 11. The processing illustrated in the flowcharts in FIGS. 7 and 11 is performed by a program stored in the memory 302 and read out by the CPU 301.

The density adjustment calibration to be executed by the image forming apparatus 100 will be described with reference to FIGS. 7 to 11.

I. First Calibration

First, the CPU 301 controls the printer B so as to output a test print 1 and measures the surface potential of the photosensitive drum (S101).

In step S101, the CPU 301 inputs first pattern image data to the printer control unit 109 and controls the printer B so as to form a first pattern image on a recording medium. Hereinafter, the recording medium having the first pattern image thereon will be called a test print 1. It should be noted here that the contrast potential at time when the printer B outputs the test print 1 is set to a value corresponding to environment information. The term "environment information" may refer to an absolute moisture amount around the image forming apparatus 100, for example. The CPU 301 sets an initial value of the contrast potential from the absolute moisture amount detected by a sensor (not illustrated) with reference to a correspondence relationship between the absolute moisture amounts and the contrast potentials, for example. Here, the correspondence relationship between the absolute moisture amounts and the contrast potentials are prestored in the memory 302.

The first pattern image may for example include a range pattern and density pattern. The range pattern may be a yellow, magenta, cyan, and black range pattern. The density patter may be a yellow, magenta, cyan, and black maximum density pattern. The range pattern may be formed on the basis of 128 image signal values, for example. The maximum density pattern may be formed on the basis of 255 image signal values, for example.

In step S101, the CPU 301 measures the surface potential of the photosensitive drum. The CPU 301 controls the surface potential sensor 125 to measure the surface potential of the photosensitive drum 121 corresponding to a region having an electrostatic latent image having a yellow maximum density pattern. The CPU 301 also measures the surface potential of the photosensitive drum of other colors. The CPU 301 stores, in the memory 302, a measurement result of the surface potential of the photosensitive drum corresponding to the region having an electrostatic latent image having a maximum density pattern.

The test print 1 is mounted on the platen glass 102 by a user. When a user presses a start button on the operating unit 217, the CPU 301 controls the reader A so as to read the test print 1 (S102). In step S102, the CPU 301 converts brightness information of the first pattern image to an optical density of the first pattern image by using the LUTid 304.

Next, the CPU 301 calculates a contrast potential b corresponding to a target maximum density (S103). The contrast potential is a potential difference between a surface potential of the photosensitive drum corresponding to a region having an electrostatic latent image and a development bias used for developing the electrostatic latent image. The CPU 301 determines a contrast potential a from a difference between a surface potential of the photosensitive drum corresponding to the region having an electrostatic latent image having a maximum density pattern and a development bias used for developing the maximum density pattern.

Figure 8:
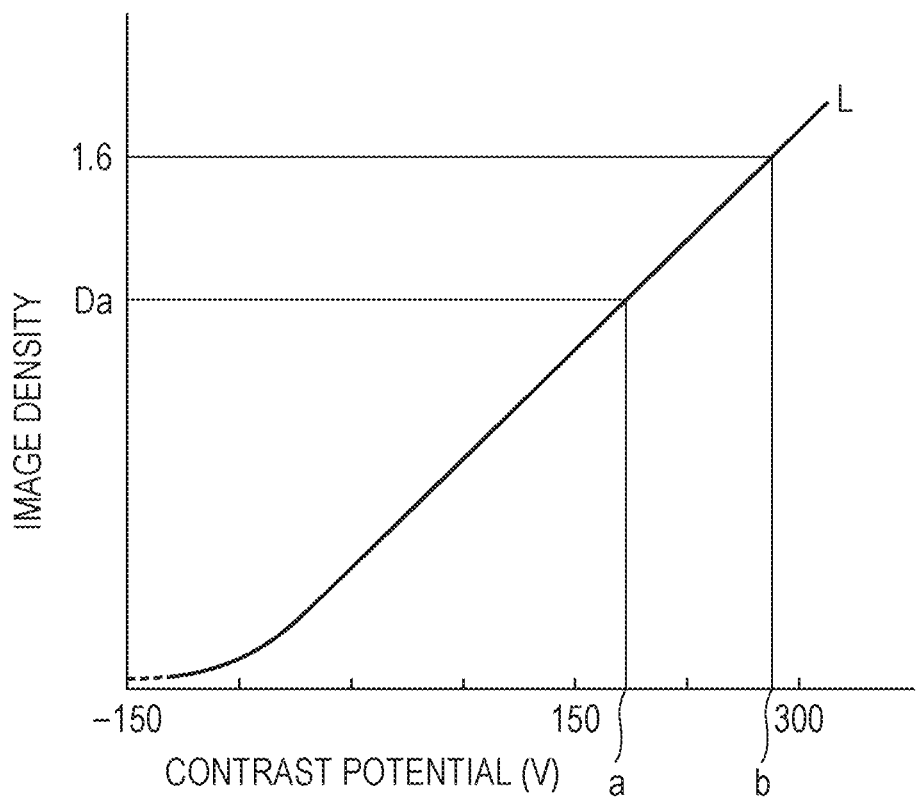
FIG. 8 is a graph illustrating a correspondence relationship between contrast potentials and image densities.

FIG. 8 is a graph illustrating a correspondence relationship between contrast potentials and image densities. FIG. 8 has a horizontal axis indicating contrast potentials and a vertical axis indicating image densities. As illustrated in FIG. 8, in a range of image densities 0.8 to 2.0 including the target maximum density, the relationship between the contrast potentials and the image densities is linear as represented by a solid line L. Accordingly, the CPU 301 estimates the contrast potential b for forming an image having the target maximum density on the basis of the contrast potential a of the maximum density pattern and a density Da of the maximum density pattern. It is assumed here that the target maximum density is equal to 1.6.

The CPU 301 calculates the contrast potential b corresponding to the target maximum density on the basis of the solid line L. A table or a function corresponding to the solid line L is prestored in the memory 302. The CPU 301 may calculate the contrast potential b by using Expression (1), for example.

$$b = (a + ka) \times 1.6 / Da \quad (1)$$

where ka is a correction coefficient depending on the type of development method.

Figure 9:
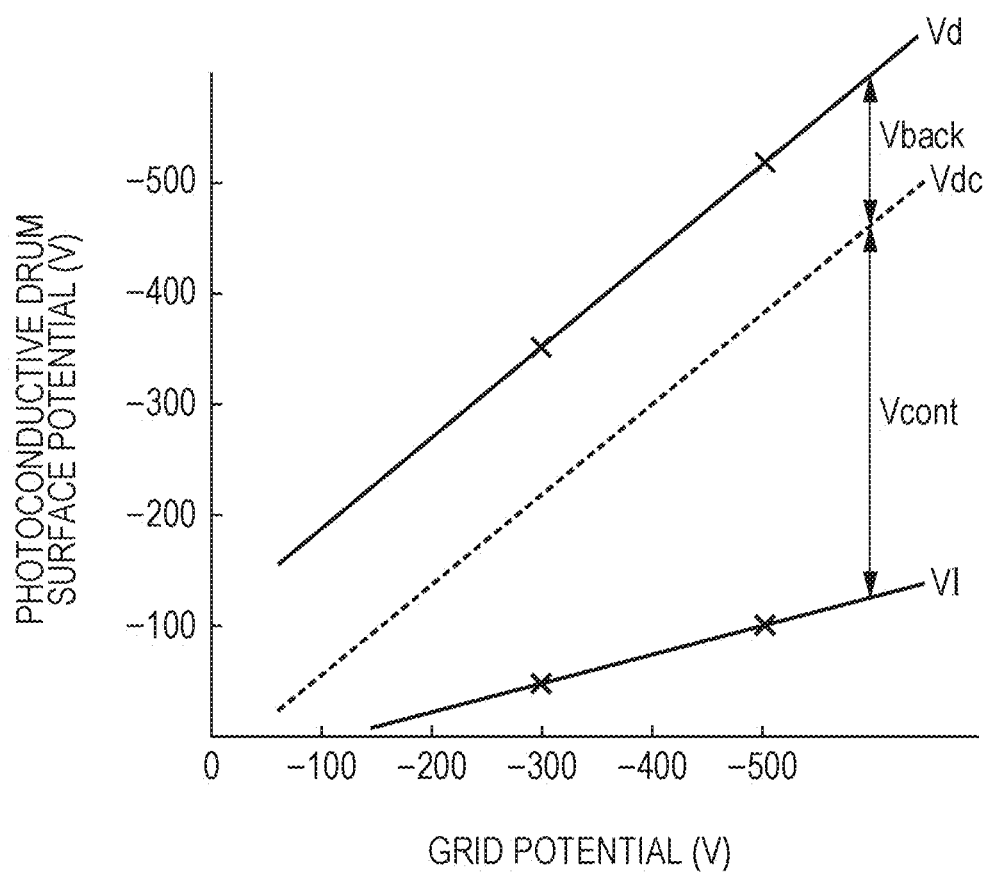
FIG. 9 is a graph illustrating a correspondence relationship between surface potentials of a photosensitive drum and grid potentials to be supplied to a charger.

Next, the CPU 301 sets a grid potential Vg and a development bias potential Vdc from the contrast potential b (S104). FIG. 9 is a graph illustrating a correspondence relationship between the surface potentials of the photosensitive drum and grid potentials supplied to the charger 122. In step S104, the CPU 301 controls the grid potentials and the emission intensities of the semiconductor laser 310 as predetermined conditions so as to form an electrostatic latent image on the photosensitive drum and acquires the correspondence relationship illustrated in FIG. 9 on the basis of a result of the measurement performed on the region corresponding to the electrostatic latent image output from the surface potential sensor.

The CPU 301 first sets the grid potential Vg to −300 V, controls the semiconductor laser 310 on the basis of a laser output signal having a minimum light emission level, and controls the surface potential sensor to measure a surface potential Vd1 of the photosensitive drum. The CPU 301 sets the grid potential Vg to −300 V, controls the semiconductor lasers 310 for colors on the basis of a laser output signal having a maximum light emission level, and controls the surface potential sensor to measure a surface potential Vl1 of the photosensitive drum. The CPU 301 sets the grid potential Vg to −700 V, controls the semiconductor laser 310 and measures surface potentials Vd2 and Vl2 of the photosensitive drum.

Then, the CPU 301 performs linear interpolation or extrapolation on the surface potentials Vd1, Vd2, Vl1, and Vl2 to acquire a correspondence relationship between the grid potentials and surface potentials of the photosensitive drum. A contrast potential Vcont is a difference between the development bias Vdc and the surface potential Vl, as illustrated in FIG. 9. It is assumed here that the development bias Vdc is a value higher than the surface potential Vd by a predetermined value Vback. It is assumed that the predetermined value Vback is 150 V, for example. Thus, the CPU 301 acquires the grid potential being the contrast potential b and the development bias on the basis of the correspondence relationship illustrated in FIG. 9. The predetermined value Vback is a value set so as to prevent a developing agent from attaching to a region to which a laser beam is not irradiated on the photosensitive drum.

II. Second Calibration

Figure 10:
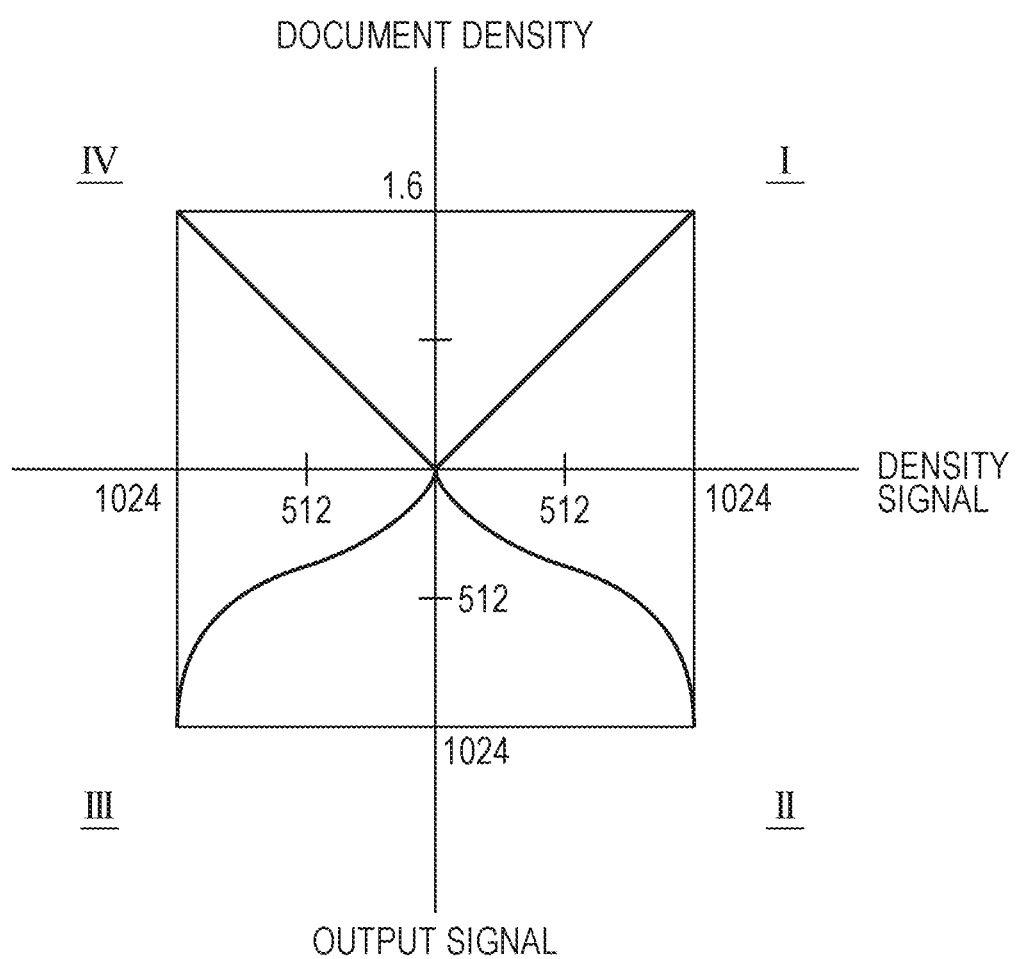
FIG. 10 is a schematic diagram of a characteristic conversion chart.

FIG. 10 illustrates a characteristic conversion chart. A region I represents a characteristic of the reader A configured to convert a document density to a density signal. A region II represents a characteristic of the tone control unit 311 (LUTa 306) configured to convert a density signal to a laser output signal. A region III represents a tone characteristic of the printer B configured to convert a laser output signal to an output density. A region IV represents a correspondence relationship between document densities and output densities. The correspondence relationship between document densities and output densities represents a whole tone characteristic of the image forming apparatus 100.

The image forming apparatus 100 corrects the tone characteristic of the printer B represented in the region III to correct the tone characteristic of the printer B to an ideal tone characteristic. In the second calibration, the printer B forms a pattern image without the tone correction performed by the tone control unit 311, and the LUTa 306 is generated by replacing a laser output signal for forming the pattern image by a laser output signal for an ideal density.

The second calibration will be described below with reference to FIG. 11. The CPU 301 controls the printer B so as to output a test print 2 (S201). In step S201, the CPU 301 inputs second pattern image data to the printer control unit 109 and controls the printer B so as to form a second pattern image on the recording medium. At this point, the CPU 301 does not control the LUTa 306 to convert the second pattern image data but controls the printer B to form the second pattern image. Hereinafter, the recording medium having the second pattern image thereon will be called a test print 2. The grid potential and development bias for outputting the test print 2 from the printer B are set to the values acquired in the first calibration.

The test print 2 may include a pattern image having a density converted to 64 stages (64 tones) for each color. Here, in the second pattern image, the number of pattern images having a low density region is higher than the number of pattern images having a higher density region. Thus, the tone characteristics in the low density region can be adjusted better.

The test print 2 may be configured to include a second pattern image having a low resolution and a second pattern image having a high resolution, for example. The low resolution may range from 160 lpi to 180 lpi, for example. The high resolution may range from 250 lpi to 300 lpi, for example. The dither processing unit 307 performs low resolution dither processing and high resolution dither processing on the second pattern image data. Here, the low resolution dither processing is suitable for a tone image, and the high resolution dither processing is suitable for a character image. There is a possibility that performing different types of dither processing on an equal image signal value results in images having densities of different values. Accordingly, the CPU 301 may control image forming conditions corresponding to the types of dither processing on the basis of scanning results of the second pattern image corresponding to the different types of dither processing performed on the test print 2. In a case where tone characteristics significantly differ among resolutions, the second pattern image data may be set differently for each of the resolutions. The CPU 301 may act as a controller that controls the generation of image forming conditions and formation of images. The controller may also be implemented as software stored on a non-transitory computer readable medium that is implemented by the one or more processors such as the CPU 301.

In a case where the printer B is capable of forming images having 3 or higher types of resolution, the printer B may output the test print 2 in a plurality of pages.

The test print 2 may be mounted on the platen glass 102 by a user. When a user presses the start button on the operating unit 217, the CPU 301 controls the reader A so as to scan the test print 2 (S202). In step S202, the CPU 301 converts the brightness information of the second pattern image to an optical density of the second pattern image by the LUTid 304.

Next, the CPU 301 generates an LUTa 306 (S203). In step S203, the CPU 301 first acquires a tone characteristic of the printer B on the basis of the image signal values of the second pattern image data and the density values of the second pattern image. In order to convert a density Di of an image signal value i to a target density Ditgt here, the image signal value i may be converted to an image signal value itgt corresponding to the target density Ditgt of the image signal value i. The CPU 301 generates a table for conversion from the image signal value i to the image signal value itgt. The table for conversion from the image signal value i to the image signal value itgt corresponds to the LUTa 306. The CPU 301 generates the LUTa 306 on the basis of the table for conversion from the image signal value i to the image signal value itgt.

The second pattern image is a 64-tone pattern image. Because the number of tones of an image formed by the printer B is equal to 256 tones, density data of the pattern image lacks for acquiring the LUTa 306. Accordingly, the CPU 301 calculates the lacking density data by linear interpolation. Thus, the CPU 301 can acquire tone characteristics of the printer B within the 256-tone range.

The CPU 301 executes the density adjustment calibration to correct changes in image densities of a monochromatic image and tone characteristics of the monochromatic image.

III. Color Adjustment Calibration

Next, the color adjustment calibration for generating the 4DLUT 312 to be executed by the CPU 301 such that the color of a mixed-color image can be a target color will be described with reference to FIGS. 12 to 14. The color adjustment calibration forms a pattern image for a mixed-color image on a recording medium and generates a 4DLUT 312 for conversion of a combination of yellow, magenta, cyan, and black image signal values such that the color of the pattern image can be target color.

Figure 12:
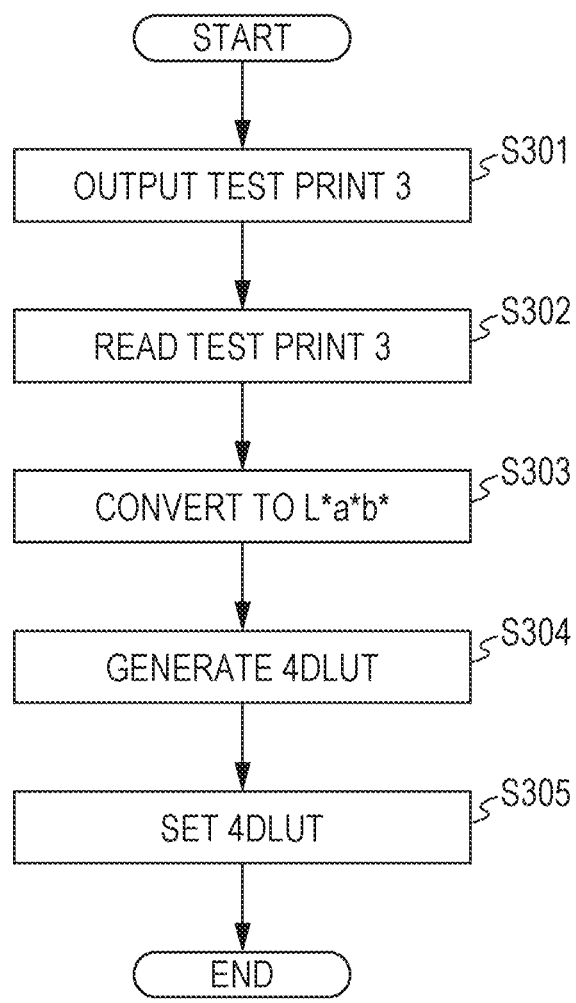
FIG. 12 is a flowchart illustrating a color adjustment calibration.

When a command to execute the color adjustment calibration is input from the operating unit 217, the CPU 301 executes the color adjustment calibration illustrated in the flowchart in FIG. 12. The processing in the flowchart illustrated in FIG. 12 is performed by a program stored in the memory 302 and read out by the CPU 301.

The CPU 301 first controls the printer B so as to output a test print 3 (S301). In step S301, the CPU 301 inputs third pattern image data to the printer control unit 109 and controls the printer B to form a third pattern image on a recording medium. The CPU 301 then controls the LUTa 306 to convert the third pattern image data and controls the printer B to form the third pattern image on the basis of the converted third pattern image data. Hereinafter, the recording medium having the third pattern image thereon will be called a test print 3. The grid potential and development bias applied by the printer B for outputting the test print 3 are set to values acquired by the first calibration.

Figure 13:
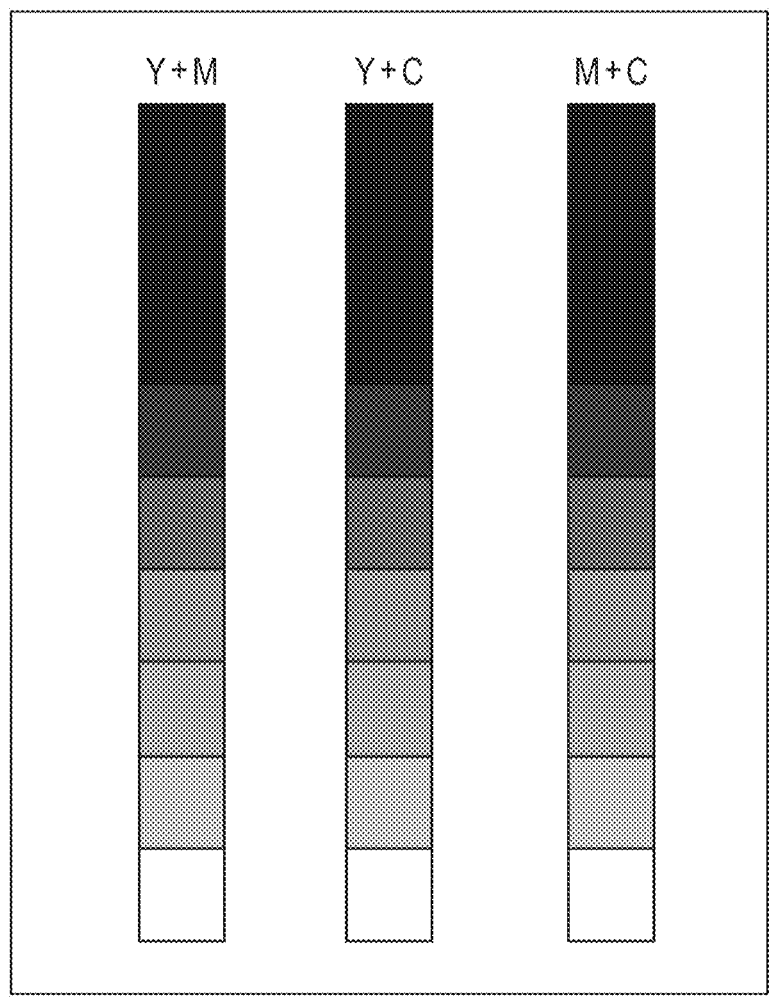
FIG. 13 is a schematic diagram of a test print.
Figure 14:
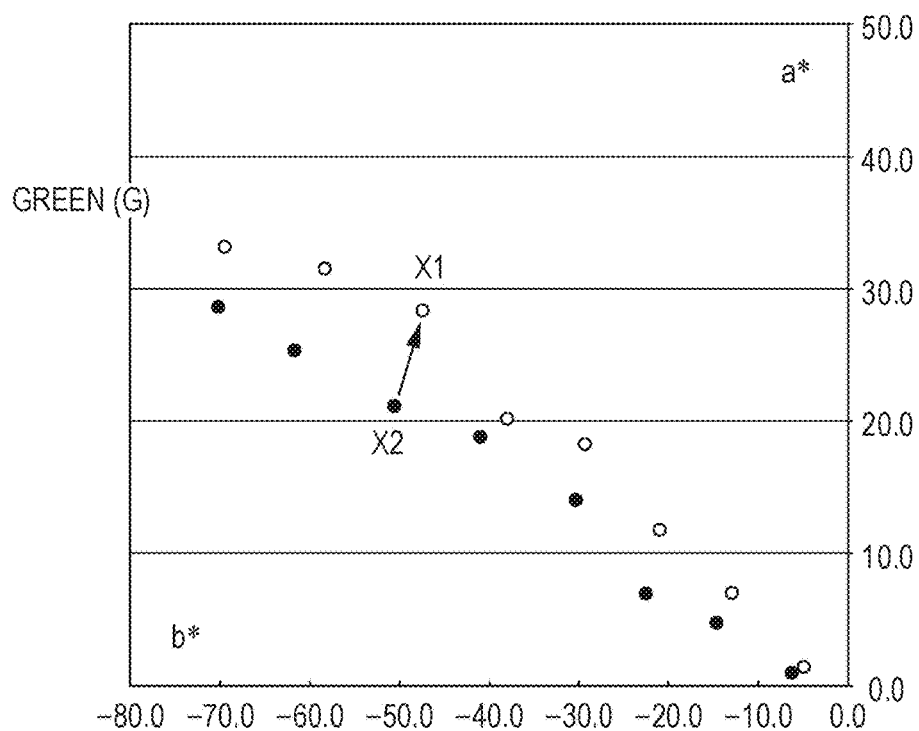
FIG. 14 is an enlarged view of an essential part of an L*a*b* coordinate system.

FIG. 13 is a schematic diagram illustrating the test print 3. The test print 3 includes a pattern image of a mixed color of yellow and magenta, a pattern image of a mixed color of yellow and cyan, and a pattern image of a mixed color of magenta and cyan. The test print 3 may further include a pattern image of a mixed color of black and a chromatic color. Alternatively, the test print 3 may further include a pattern image of a mixed color of yellow, magenta, and cyan.

The pattern image of a mixed color of yellow and magenta illustrated in FIG. 13 may be formed by using multi-level yellow image signal values and multi-level magenta image signal values, for example. The number of mixed-color pattern images may be equal to any proper number for generating the 4DLUT 312.

The test print 3 may be mounted on the platen glass 102 by a user. When a user presses a start button on the operating unit 217, the CPU 301 controls the reader A so as to scan the test print 3 (S302). In step S302, the CPU 301 acquires brightness information on mixed-color pattern images. The CPU 301 converts brightness information (RGB brightness data) on mixed-color pattern images to color data (L*a*b* data) (S303). Here, the L*a*b* data represent color in a device-independent color space. The L*a*b* data includes three values. The L*a*b* data contains brightness L* and parameters (a* and b*) representing a hue and a chroma.

The CPU 301 generates a 4DLUT 312 such that the differences (color difference) between L*, a*, and b* values of the mixed-color pattern images and target values can be lower than a predetermined value (S304). FIG. 14 illustrates a* and b* coordinates of predetermined brightnesses in an L*a*b* color space. In step S304, the CPU 301 generates a 4DLUT 312 such that L*, a*, and b* values of a mixed-color pattern image X2 can be equal to a target value X1. The CPU 301 determines yellow, magenta, cyan, and black image signal values so as to be equal to the target value X1. Next, the CPU 301 generates a 4DLUT 312 for converting the yellow, magenta, cyan, and black values such that a combination of image signal values corresponding to the mixed-color pattern image X2 can be a combination of image signal values corresponding to the target value X1. The CPU 301 sets the 4DLUT 312 (S305) and completes the color adjustment calibration processing.

Next, determination processing for determining whether the CPU 301 executes the color adjustment calibration processing or not will be described. If the density adjustment calibration is executed, the density of the monochromatic image is corrected to a target density. However, even when the density adjustment calibration is executed, there is a possibility that the mixed-color image does not have target color. For that, a user may not appropriately judge whether the color adjustment calibration is to be executed or not after the density adjustment calibration is executed. Determination processing for automatically determining whether the color adjustment calibration is to be executed or not will be described.

The CPU 301 controls whether the color adjustment calibration is to be executed or not on the basis of a measurement result of a patch image measured by the density sensor 126. Every time the density adjustment calibration is executed, the CPU 301 controls the image forming units 120, 130, 140, and 150 to form patch images on the basis of patch image data, controls the density sensor 126 to measure the patch images, and stores the densities of the patch images in the memory 302. The CPU 301 then determines that the color adjustment calibration is to be executed if the difference between the density of the patch image acquired after the density adjustment calibration has been executed last time and the density of the patch image acquired this time is higher than a predetermined value.

Image forming conditions set for the printer B is determined in the immediately preceding density adjustment calibration processing. Thus, the density of the monochromatic image on the recording medium is controlled to a target density. However, even when the density of the monochromatic image formed on the recording medium has the target density, the densities of the monochrome patch images on the intermediate transfer belt 113 may not be the target density. The density sensor 126 is configured to detect patch images on the intermediate transfer belt 113. Thus, the detection results from the patch images are not influenced by a re-transfer phenomenon, secondary transfer efficiency, and heat supplied from the fuser. In other words, when the densities of the patch images on the intermediate transfer belt 113 change, it may be considered that one of a re-transfer phenomenon, a secondary transfer efficiency, and heat supplied from the fuser may have an influence on the detection.

Figure 15:
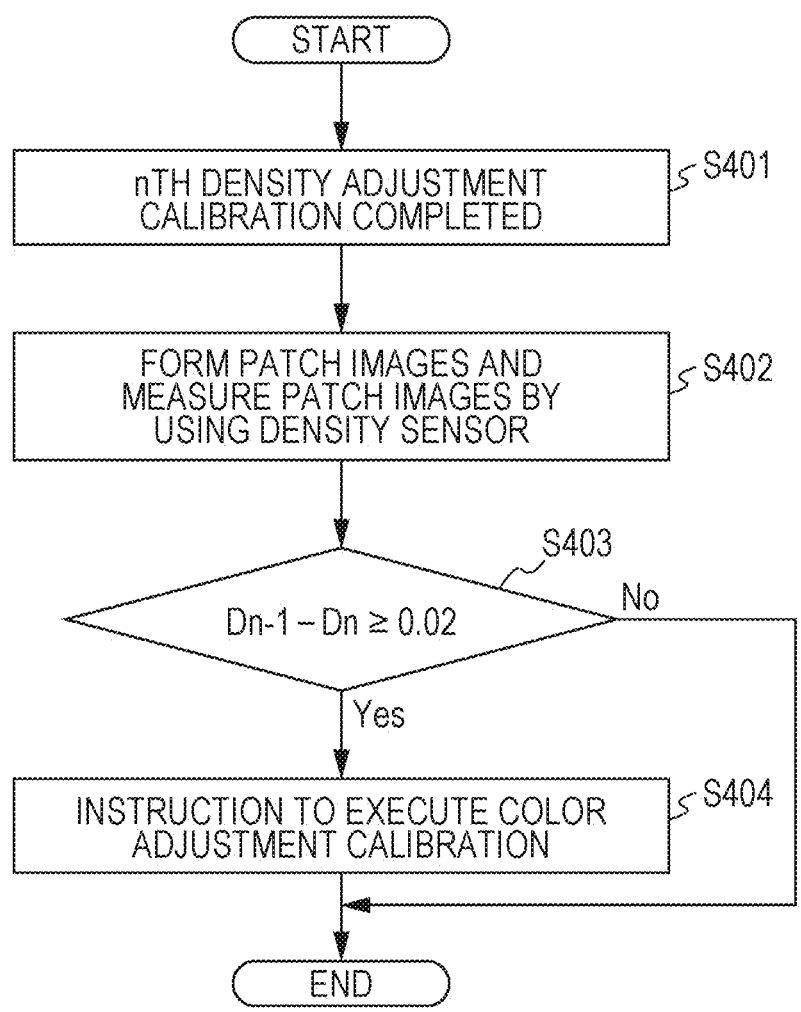
FIG. 15 is a flowchart illustrating determination processing.

After the density adjustment calibration is executed, the CPU 301 performs the determination processing illustrated in FIG. 15. The processing in the flowchart illustrated in FIG. 15 is performed by a program stored in the memory 302 and read by the CPU 301.

After the nth density adjustment calibration is executed (S401), the CPU 301 controls the printer B to form patch images on the intermediate transfer belt 113 and controls the density sensor 126 to measure the patch images (S402). In step S402, a patch image is formed for each of colors of yellow, magenta, cyan, and black. The image signal value for forming the patch images may be equal to 96, for example. The CPU 301 controls the LUTa 306 to correct the image signal values, controls the PWM unit 308 to generate a laser output signal from the corrected image signal values and controls the LD 309 to emit the semiconductor laser 310 based on the laser output signal.

Figure 16:
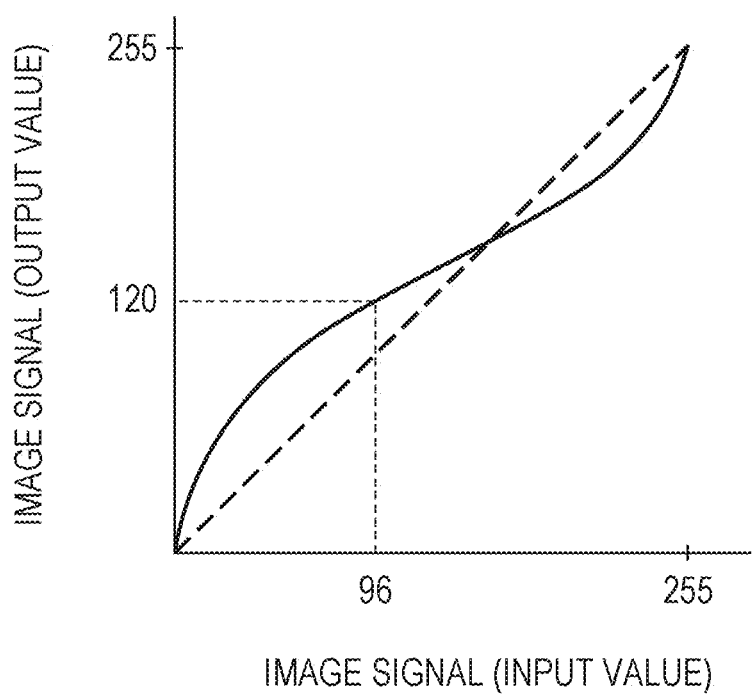
FIG. 16 is a schematic diagram illustrating a look-up table.

For example, in a case where the LUTa 306 is an LUT represented by the solid line in FIG. 16, the image signal value 96 is corrected to an image signal value of 120. The LUTa 306 is set for each color. Thus, the image signal values of the colors may not be equal. The detected values from the density sensor 126 are converted to a density value Dn by the A/D conversion circuit 181 and the density conversion circuit 182. The density value Dn is compared with a density value Dn−1 detected after the (n−1)th density adjustment calibration is executed, and, if the difference is equal to or higher than a threshold value, it is determined that the color of the mixed-color image has changed (S403). The threshold value may be equal to 0.02, for example. The threshold value is determined properly in consideration of the detection precision of the density sensor 126. This can prevent the density sensor 126 from wrongly detecting the density of a patch image and prevent unnecessary color adjustment calibration from being executed.

In step S403, if the CPU 301 determines that the color of the mixed-color image has changed, the CPU 301 controls the display 218 in the operating unit 217 to display an instruction to execute color adjustment calibration (S404). In other words, in step S404, the display 218 notifies that the 4DLUT 312 is to be updated. Alternatively, the display 218 may notify update timing for the 4DLUT 312 to a user. The CPU 301 in response to a command to execute color adjustment calibration input from operating unit 217 executes the color adjustment calibration illustrated in the flowchart in FIG. 12. The CPU 301 then completes the determination processing. A notifying unit may be implemented by the CPU 301 to send instructions to display a notification on the display 218 about updating timings to a user. The notifying unit may be implemented in a non-transitory computer readable medium encoded with instructions that are implemented by one or more processors.

On the other hand, if it is determined in step S403 that the difference between the density value Dn and the density value Dn−1 is lower than the threshold value, the CPU 301 determines that the color of the mixed-color image has not changed, and the determination processing completes.

Because the CPU 301 does not automatically execute the color adjustment calibration, the color adjustment calibration can be prevented from being executed by a user at an unnecessary time point. The CPU 301 may further notify a user of that the color adjustment calibration is to be executed and prompt a user to execute the color adjustment calibration.

Having described that the configurations of the density adjustment calibration and the color adjustment calibration as a method for correcting a monochromatic image and a mixed-color image, embodiments are not limited to the correction method, but other methods are also applicable. For example, the color conversion may not be implemented by an LUT but by computing processing such as (masking, windowing, rescaling, etc.).

A configuration will be described below in which the determination processing (FIG. 15) uses the density of a patch image formed on the intermediate transfer belt 113 as a reference density value.

Because the reader A scans a pattern image on a recording medium in the density adjustment calibration, the CPU 301 may not perform the determination processing if the density adjustment calibration is not executed. Accordingly, the CPU 301 controls the printer B to form a patch image on the intermediate transfer belt 113, controls the density sensor 126 to measure the patch image, and performs patch gradation control for controlling image forming conditions on the basis of a result of the measurement performed by the density sensor 126. Thus, even when the density adjustment calibration is not executed, the density of output images formed by the image forming apparatus 100 can be kept to be equal to the reference density value.

The patch gradation control can eliminate the necessity for mounting a test print on the reader A by a user, which produces higher usability and less downtime than those of the density adjustment calibration. On the other hand, the patch gradation control is less accurate than the density adjustment calibration because the patch gradation control controls image forming conditions on the basis of the density of a patch image on the intermediate transfer belt 113.

The patch gradation control predicts a change in tone characteristics from a difference between the density of a patch image and the reference density value and corrects the LUTa 306 such that ideal tone characteristics can be acquired. The reference density value is determined on the basis of a measurement result of a patch image formed on the intermediate transfer belt 113 in the determination processing.

The CPU 301 performs the determination processing illustrated in FIG. 17A after the density adjustment calibration is executed. The processing in the flowchart illustrated in FIG. 17A is performed by a program stored in the memory 302 and read out by the CPU 301.

After the nth density adjustment calibration is executed (S501), the CPU 301 controls the printer B to form a patch image on the intermediate transfer belt 113 and controls the density sensor 126 to measure the patch image (S502).

In step S502, the detected value from the density sensor 126 is converted to the density value Dn by the A/D conversion circuit 181 and the density conversion circuit 182. After the density value Dn is compared with the density value Dn−1 detected after the (n−1)th density adjustment calibration is executed. If the difference is equal to or higher than a threshold value, it is determined that the color of the mixed-color image has changed (S503). The threshold value may be equal to 0.02, for example.

In step S503, if the CPU 301 determines that the color of the mixed-color image has changed, the CPU 301 controls the display 218 in the operating unit 217 to display an instruction to execute color adjustment calibration (S504). In response to a command to execute the color adjustment calibration input through the operating unit 217, the CPU 301 executes the color adjustment calibration illustrated in the flowchart in FIG. 12.

The CPU 301 stores the density value Dn of the patch image as a reference density value in the memory 302 (S505) and completes the determination processing.

On the other hand, if the difference between the density value Dn and the density value Dn−1 is lower than a threshold value in step S503, the CPU 301 determines that the color of the mixed-color image has not changed, and the processing moves to step S505. The CPU 301 determines the reference density value in step S505 and completes the determination processing.

If a predetermined condition is satisfied, the CPU 301 executes patch gradation control. The CPU 301 executes patch gradation control if the number recording media having images formed by the image forming apparatus 100, for example, is higher than a predetermined number.

In the patch gradation control, the CPU 301 acquires the amount of change in density value of the patch image on the intermediate transfer belt 113, generates a correction table on the basis of the amount of change, and updates the LUTa 306 on the basis of the correction table. Thus, in the patch gradation control, the CPU 301 corrects the patch image data on the basis of the LUTa 306 and controls the printer B to form a patch image on the basis of the corrected patch image data.

The tone characteristics immediately after the density adjustment calibration is executed are ideal tone characteristics. Thus, the CPU 301 stores, in the memory 302 as a reference density value, the density of the patch image formed on the intermediate transfer belt 113 immediately after the density adjustment calibration is executed.

In a case where the tone characteristics have changed significantly due to an environmental change, the density adjustment calibration is to be executed.

If the CPU 301 satisfies a predetermined condition, patch gradation control illustrated in FIG. 17B is executed. The processing in the flowchart illustrated in FIG. 17B is executed by a program stored in the memory 302 and read out by the CPU 301.

The CPU 301 controls the image forming units 120, 130, 140, and 150 to form patch images on the intermediate transfer belt 113 (S601). In step S601, a patch image is formed for each of colors of yellow, magenta, cyan, and black. The image signal value for forming the patch images may be equal to 96 which is the same as in the determination processing. The CPU 301 controls the LUTa 306 to correct the image signal value, controls the PWM unit 308 to generate a laser output signal from the corrected image signal value, and controls the LD 309 to emit semiconductor laser 310 on the basis of the laser output signal.

Figure 18:
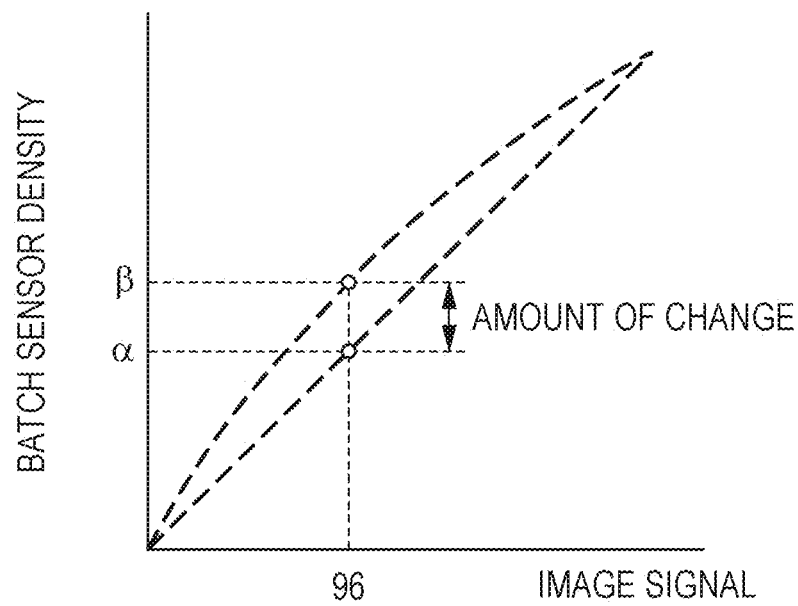
FIG. 18 is a graph illustrating a correspondence relationship between image signals and densities of a patch image.

The CPU 301 controls the density sensor 126 to measure the patch images on the intermediate transfer belt 113 (S602). The detected values from the density sensor 126 are converted to a density value by the A/D conversion circuit 181 and the density conversion circuit 182. The CPU 301 then acquires a difference between the density value of the patch images and a reference density value and generates a correction table (S603). FIG. 18 is a graph illustrating a correspondence relationship between image signal values of patch images and densities of the patch images. FIG. 18 illustrates a density value α as a reference density value and a density value β corresponding to the actual density of the patch image. The amount of change from the reference density corresponds to the difference between the actual density value β and the reference density value α, as illustrated in FIG. 18.

Figure 19A:
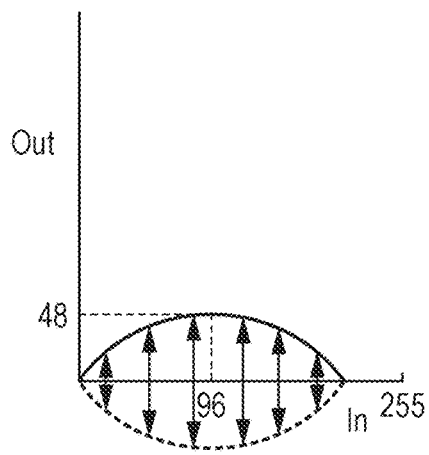
FIGS. 19A to 19C illustrate a method for generating a correction characteristic table.

A method for generating the correction table will be described below. FIG. 19A is a correction coefficient table illustrating a correspondence relationship between image signal values and correction gains. On the correction coefficient table, a correction gain corresponding to the input value 96 of the image signal is higher than correction gains corresponding to other input values. The correction gain corresponding to the input value 96 of the image signal may be equal to 48, for example. The correction amount of the output value of an image signal to the input value of the image signal may be calculated by Expression (2).

$$\text{Correction Amount} = \text{Correction Gain} \times \{-(\text{Amount of Change in Density})/\text{Maximum Correction Gain}\} \quad (2)$$

The correction gain for each input value is determined with reference to a correction coefficient table. The amount of change in density corresponds to a difference between a density value of a patch image and a reference density value. The maximum correction gain corresponds to a maximum value of the correction gain on the correction coefficient table. Referring to FIG. 19A, the maximum value of the correction gain is equal to 48. The correction coefficient table is given for illustration purpose, and the correction gain value is not limited to the values illustrated in FIG. 19A.

Figure 19B:
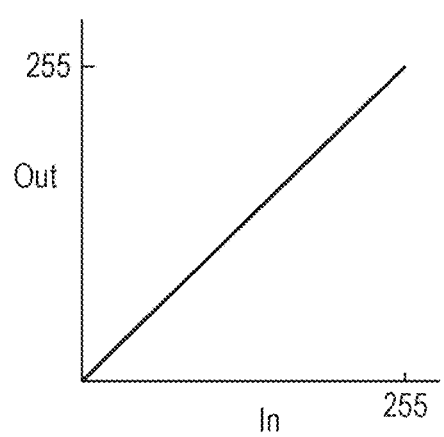
Figure 19C:
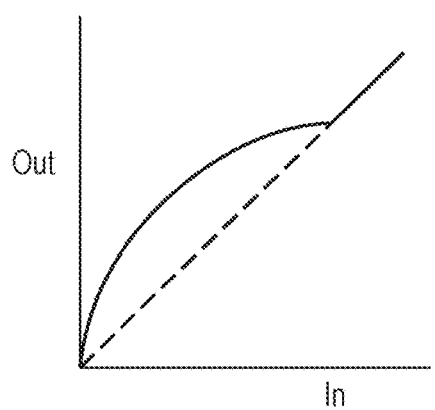

FIG. 19B is a schematic diagram of a basic LUT configured to convert an input value of an image signal to an output value of the image signal. The correction amount is added to an output value of the basic LUT to generate a correction table. FIG. 19C is a schematic diagram of the correction table generated on the basis of the correction amount and the basic LUT. The correction table illustrated in FIG. 19C is usable for correcting tone characteristics of an image such that the density value of the patch image can be equal to a target density value. The CPU 301 synthesizes the LUTa 306 and the correction table to update the LUTa 306. Here, for example, the correction amount may be calculated as 40×−10/48=−8.3 from Expression (2) where an input value of the image signal is 48, the correction gain corresponding to the input value is 40, and the amount of change in density is 10. When the correction amount corresponding to the input value 48 of the image signal is equal to −8.3, the output value of the image signal is calculated as 48−8.3=39.7≈40.

The CPU 301 synthesizes the LUTa 306 and the correction table with the LUTa 306, updates the LUTa 306 (S604), and completes the processing of the patch gradation control. In a case here the image forming apparatus 100 forms an output image on the basis of image data, the image data (image signal) is corrected on the basis of the LUTa 306.

A configuration of the image forming apparatus 100 will be described below which has a color sensor on a conveyance path for conveying a recording medium. In the image forming apparatus 100 having a color sensor on a conveyance path therein, the CPU 301 can automatically execute the density adjustment calibration and the color adjustment calibration. In other words, a user may not mount a test print on the reader A.

Figure 20:
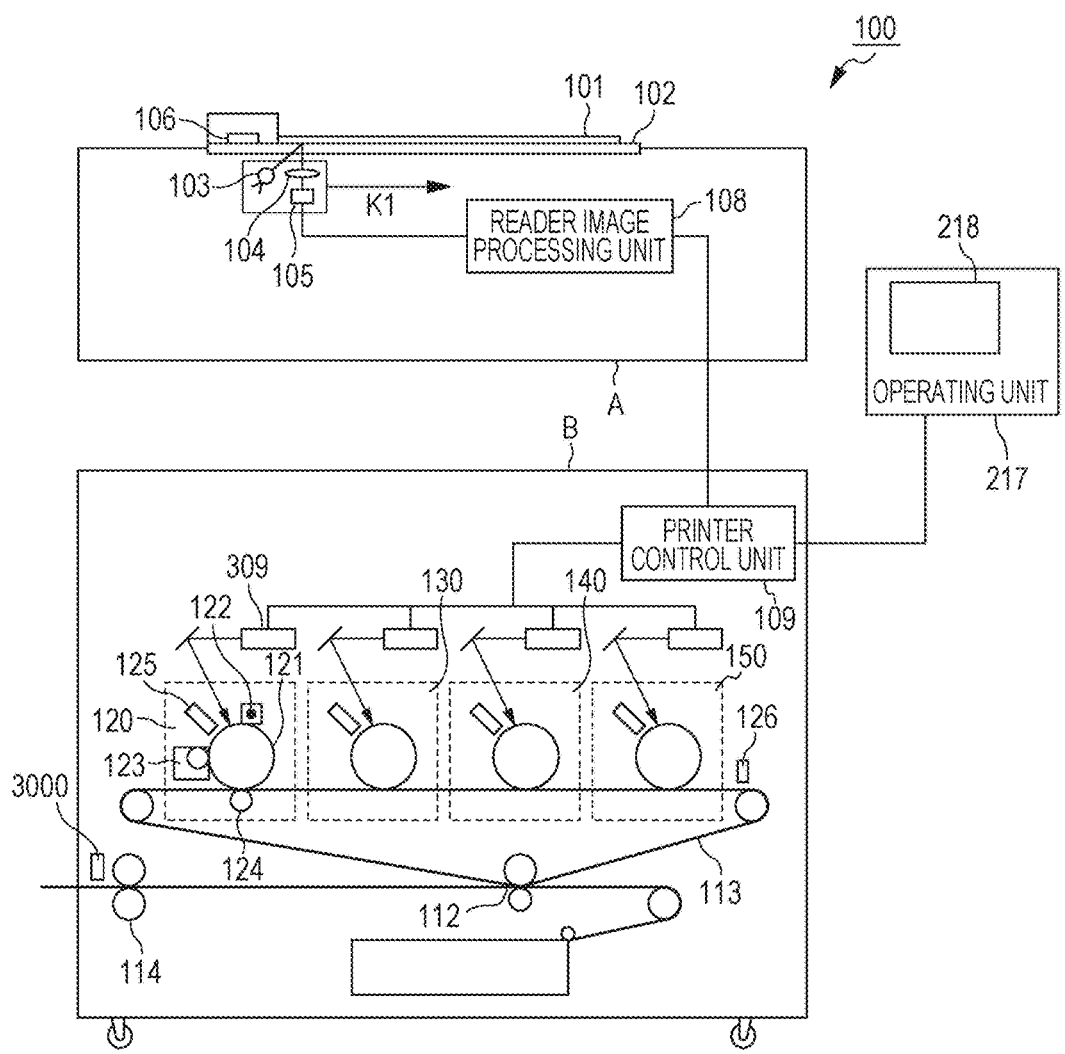
FIG. 20 is a schematic cross-sectional view of a variation example of the image forming apparatus.

FIG. 20 is a schematic cross-sectional view of the image forming apparatus 100 having a color sensor 3000. The image forming apparatus 100 illustrated in FIG. 20 includes the color sensor 3000 on a downstream side of the fuser 114 on a conveyance path for conveying a recording medium. The color sensor 3000 is configured to measure a pattern image fixed to a recording medium by the fuser 114. In other words, the color sensor 3000 reads test prints 1, 2, and 3. Two or more of test prints 1, 2, and 3, may be combined onto a single recording medium. One or more of test prints 1, 2, and 3 may be formed onto multiple recording mediums. In response to a command to execute the density adjustment calibration input from the operating unit 217, the CPU 301 controls the color sensor 3000 to read a first pattern image and a second pattern image. In response to a command to control the operating unit 217 to execute the color adjustment calibration, the CPU 301 controls the color sensor 3000 to read a third pattern image. Thus, a user may input one of those commands through the operating unit 217 so that the CPU 301 can execute the corresponding density adjustment calibration or color adjustment calibration, which can eliminate the necessity for a user to mount a test print on the reader A.

Figure 21A:
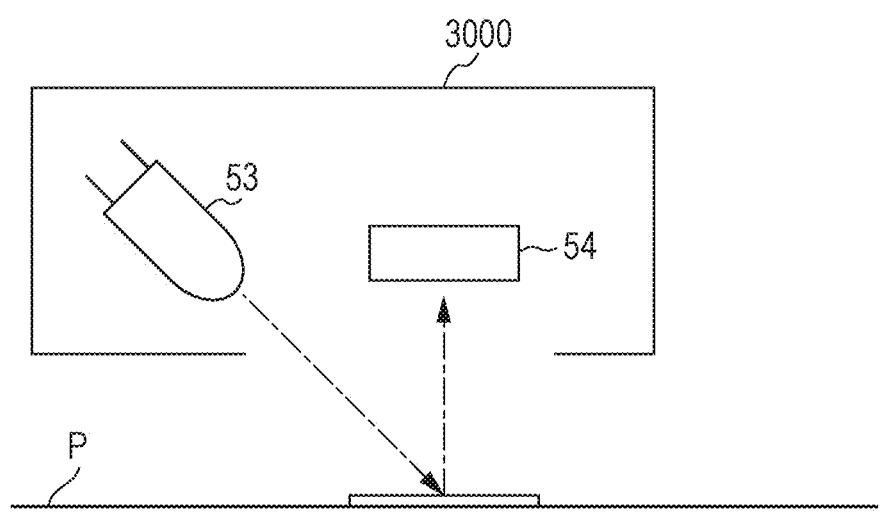
FIGS. 21A and 21B are cross-sectional views of essential parts of a color sensor.
Figure 21B:
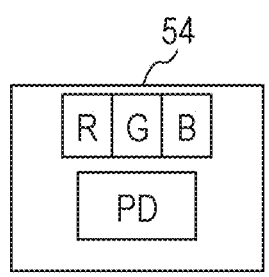

FIG. 21A is a cross-sectional view of an essential part of the color sensor 3000, and FIG. 21B is a schematic block diagram of a light receiving element in the color sensor 3000. The color sensor 3000 includes a white color LED 53 and a charge-storage-type sensor 54 having an RGB ON-chip filter. The white color LED 53 functions as a light emitting element, and the charge-storage-type sensor 54 functions as a light receiving element. The color sensor 3000 scans a pattern image fixed to a recording medium P and outputs red (R), green (G), and blue (B) luminance signals.

The color sensor 3000 controls the light emitted from the white color LED 53 to be irradiated to the recording medium P having the fixed pattern image and controls the charge-storage-type sensor 54 to detect the irregular reflection light intensity toward a 0-degree direction. As illustrated in FIG. 21B, the charge-storage-type sensor 54 has red (R), green (G), and blue (B) pixels which are separate from each other.

The charge-storage-type sensor 54 may be a photodiode, for example. Alternatively, the charge-storage-type sensor 54 may be a line sensor having several sets of red (R), green (G), and blue (B) pixels. The color sensor 3000 may have a light emitting element and a light receiving element which are laid out such that the incident angle can be equal to 0 degrees and the reflection angle can be equal to 45 degrees. The color sensor 3000 may have a configuration having LEDs emitting red, green and blue light beams and a photodiode. The color sensor 3000 is configured to a luminance signal of a pattern image on a recording medium to the CPU 301. The CPU 301 executes the density adjustment calibration or the color adjustment calibration on the basis of the luminance signal transferred from the color sensor 3000.

Figure 22:
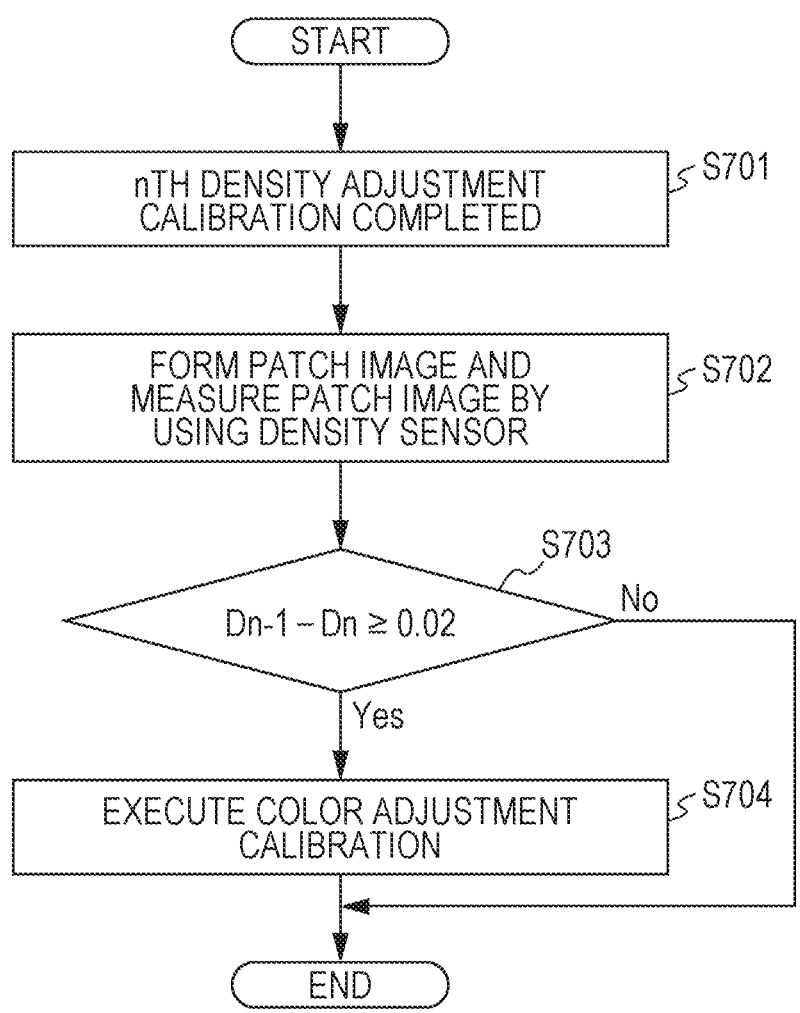
FIG. 22 is a flowchart illustrating other determination processing.

In the image forming apparatus 100, the color sensor 3000 can automatically measure the test print 1. Thus, if it is determined in the determination processing that the color of a subject mixed-color image has changed, the CPU 301 may automatically execute the color adjustment calibration. In other words, the image forming apparatus 100 may be configured to execute determination processing illustrated in FIG. 22 instead of the determination processing in FIG. 15. FIG. 22 is a flowchart illustrating a variation example of the determination processing. The processing in the flowchart illustrated in FIG. 22 is executed by a program stored in the memory 302 and read by the CPU 301.

After the nth density adjustment calibration is executed (S701), the CPU 301 controls the printer B to form a patch image on the intermediate transfer belt 113 and controls the density sensor 126 to measure the patch image (S702).

The detected value output by the density sensor 126 is converted to a density value Dn by the A/D conversion circuit 181 and the density conversion circuit 182. The density value Dn is compared with a density value Dn−1 detected in the same manner after the (n−1)th density adjustment calibration is executed. If the difference is equal to or higher than a threshold value, it is determined that the color of the mixed-color image has changed (S703).

In step S703, if the CPU 301 determines that the color of the mixed-color image has changed, the CPU 301 executes the color adjustment calibration, generates a 4DLUT 312 (S704), and completes the determination processing.

On the other hand, if, in step S703, the difference between the density value Dn and the density value Dn−1 is lower than the threshold value, the CPU 301 determines that the color of the mixed-color image has changed and completes the determination processing.

The color adjustment calibration is executed in proper timing, which can inhibit excessive execution of the color adjustment calibration. A result of an experiment will be described below. In a case where both of the density adjustment calibration and the color adjustment calibration were continuously executed, there was a five-minute downtime. In a case the density adjustment calibration was only executed, there was a three-minute downtime.

According to the present disclosure, whether calibration for adjusting color of a mixed-color image is to be executed or not may be determined. According to the present disclosure, because color adjustment calibration is executed in proper timing, the downtime can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-087602 filed Apr. 26, 2016 and No. 2017-022469 filed Feb. 9, 2017, which are hereby incorporated by reference herein in their entirety.

What is claimed is:

1. An image forming apparatus comprising:
   a converting unit configured to convert image data on the basis of conversion conditions;
   a plurality of image forming units configured to form images, each having a different color, on a recording medium;
   a scanning unit configured to scan a pattern image formed on a recording medium;
   a first generating unit configured to control the plurality of image forming units to form a monochromatic pattern image on a recording medium, control the scanning unit to scan the monochromatic pattern image, and generate an image forming condition on the basis of a result of the scanning performed on the monochromatic pattern image;
   a second generating unit configured to control the plurality of image forming units to form a mixed-color pattern image on a recording medium, control the scanning unit to scan the mixed-color pattern image, and generate at least one conversion condition on the basis of a result of the scanning performed on the mixed-color pattern image;
   an intermediate transfer member to which a measurement image formed by the plurality of image forming units is transferred;
   a measuring unit configured to measure the measurement image formed on the intermediate transfer member; and
   a controller configured to, after the first generating unit generates the image forming condition, control the plurality of image forming units to form the measurement image, control the measuring unit to measure the measurement image on the intermediate transfer member, and control whether to control the second generating unit to generate the at least one conversion condition or not on the basis of a result of the measurement performed on a previous measurement image and a result of the measurement performed on a current measurement image,
   wherein the plurality of image forming units form an output image on the basis of the image data converted by the converting unit.

2. The image forming apparatus according to claim 1,
   wherein the previous measurement image is formed on the basis of a previous image forming condition generated by the first generating unit; and
   wherein the current measurement image is formed on the basis of a current image forming condition generated by the first generating unit.

3. The image forming apparatus according to claim 1, wherein the controller controls the second generating unit to generate the at least one conversion condition in a case where a difference between a density of the previous measurement image and a density of the current measurement image is higher than a threshold value.

4. The image forming apparatus according to claim 1, wherein the controller controls the plurality of image forming units to form the measurement image every time the first generating unit generates the image forming condition.

5. An image forming apparatus comprising:
   a converting unit configured to convert image data on the basis of conversion conditions;
   a plurality of image forming units configured to form images, each having a different color, on a recording medium;
   a scanning unit configured to scan a pattern image formed on a recording medium;
   a first generating unit configured to control the plurality of image forming units to form a monochromatic pattern image on a recording medium, control the scanning unit to scan the monochromatic pattern image, and generate an image forming condition on the basis of a result of the scanning performed on the monochromatic pattern image;
   a second generating unit configured to control the plurality of image forming units to form a mixed-color pattern image on a recording medium, control the scanning unit to scan the mixed-color pattern image, and generate at least one conversion condition on the basis of a result of the scanning performed on the mixed-color pattern image;
   an intermediate transfer member to which a measurement image formed by the image forming unit is transferred;
   a measuring unit configured to measure the measurement image formed on the intermediate transfer member; and
   a notifying unit configured to, after the first generating unit generates the image forming condition, control the plurality of image forming units to form the measurement image, control the measuring unit to measure the measurement image on the intermediate transfer member, and notify timing for updating the at least one conversion condition on the basis of a result of the measurement performed on a previous measurement image and a result of the measurement performed on a current measurement image,
   wherein the plurality of image forming units form an output image on the basis of the image data converted by the converting unit.

6. The image forming apparatus according to claim 5,
   wherein the previous measurement image is formed on the basis of a previous image forming condition generated by the first generating unit; and
   wherein the current measurement image is formed on the basis of a current image forming condition generated by the first generating unit.

7. The image forming apparatus according to claim 5, wherein the notifying unit notifies the timing for updating the at least one conversion condition in a case where a difference between a density of the previous measurement image and a density of the current measurement image is higher than a threshold value.

8. The image forming apparatus according to claim 5, wherein the plurality of image forming units forms the measurement image every time the first generating unit generates the image forming condition.

\* \* \* \* \*